(12) United States Patent
Habichler et al.

(10) Patent No.: US 8,046,307 B2
(45) Date of Patent: Oct. 25, 2011

(54) MANAGING FUTURE CAREER PATHS

(75) Inventors: Juergen Habichler, San Mateo, CA (US); Issac Lau, Toronto (CA); Yu Cheng Weng, Toronto (CA); Anthony Deighton, San Francisco, CA (US)

(73) Assignee: Siebel Systems, Inc., San Mateo, CA (US)

( * ) Notice: Subject to any disclaimer, the term of this patent is extended or adjusted under 35 U.S.C. 154(b) by 1963 days.

(21) Appl. No.: 10/109,972

(22) Filed: Mar. 29, 2002

(65) Prior Publication Data
US 2007/0203710 A1    Aug. 30, 2007

(51) Int. Cl.
*G06Q 10/00*    (2006.01)
(52) U.S. Cl. .................. 705/320; 705/1.1; 705/321
(58) Field of Classification Search ............ 705/1
See application file for complete search history.

(56) References Cited

U.S. PATENT DOCUMENTS

| | | | |
|---|---|---|---|
| 5,416,694 A | 5/1995 | Parrish et al. | |
| 6,049,776 A * | 4/2000 | Donnelly et al. | 705/9 |
| 6,157,808 A | 12/2000 | Hollingsworth | |
| 6,266,659 B1 * | 7/2001 | Nadkarni | 707/3 |
| 6,275,812 B1 * | 8/2001 | Haq et al. | 705/11 |
| 6,289,340 B1 | 9/2001 | Puram et al. | |
| 6,301,462 B1 | 10/2001 | Freeman et al. | |
| 6,325,631 B1 * | 12/2001 | Kouba et al. | 434/219 |
| 6,524,109 B1 * | 2/2003 | Lacy et al. | 434/219 |
| 6,589,055 B2 | 7/2003 | Osborne | |
| 6,735,570 B1 * | 5/2004 | Lacy et al. | 705/7 |
| 6,754,874 B1 | 6/2004 | Richman | |
| 6,944,624 B2 * | 9/2005 | Orton et al. | 707/102 |
| 2002/0077884 A1 * | 6/2002 | Sketch | 705/12 |
| 2002/0198765 A1 | 12/2002 | Magrino et al. | |
| 2003/0028416 A1 * | 2/2003 | Pazhayannur | 705/10 |
| 2003/0046265 A1 | 3/2003 | Orton et al. | |
| 2003/0130886 A1 * | 7/2003 | Calderaro et al. | 705/11 |
| 2003/0182173 A1 | 9/2003 | D'Elena et al. | |
| 2003/0182178 A1 * | 9/2003 | D'Elena et al. | 705/11 |
| 2003/0187723 A1 * | 10/2003 | Hadden et al. | 705/11 |
| 2003/0229529 A1 * | 12/2003 | Mui et al. | 705/8 |
| 2007/0202475 A1 | 8/2007 | Habichler et al. | |
| 2007/0203710 A1 | 8/2007 | Habichler et al. | |
| 2007/0203711 A1 | 8/2007 | Nation et al. | |
| 2007/0203713 A1 | 8/2007 | Habichler et al. | |
| 2007/0208572 A1 | 9/2007 | Habichler et al. | |
| 2007/0208575 A1 | 9/2007 | Habichler et al. | |
| 2007/0218434 A1 | 9/2007 | Habichler et al. | |

\* cited by examiner

*Primary Examiner* — Jonathan Ouellette
(74) *Attorney, Agent, or Firm* — Campbell Stephenson LLP

(57) ABSTRACT

A method, system, and computer-readable medium for using competency-related information for individuals to provide a variety of benefits is described. In some situations, competency-related information is used to assist members of an organization in managing future career paths within the organization. An organization member can specify a starting position type and a target future position type, and one or more possible career paths leading from the starting position type to the target future position type (possibly through one or more intermediate position types) are identified. Competency gaps for the member relative to the position types along the career path can be identified, and actions to reduce those competency gaps can be identified for possible inclusion in a future action plan for the member.

59 Claims, 29 Drawing Sheets

Example Employee ZZ Competency Screen

505 My Current Work Position: Intermediate Software Engineer (Position # 2347)

510 My Current Skills

517 [New]  519 [Edit]

| Skill Name | Parent Skill | Root Skill Category | Current Skill Level | Skill Gap | Required Skill Level | Date Of Accomplishment | Skill Description | Criticality |
|---|---|---|---|---|---|---|---|---|
| 512 C++ Skills | Progr. Skills | Tech. Skills | Intermediate | Yes | Expert | 06/15/XX | C++ Programming | Medium |
| 514 Spanish Reading | Spanish | Lang. Skills | Fluent | No | Conversant | 01/01/XY | Spanish Reading | Low |
| ... | | | | | | | | |

520 Details For Selected Skill

| Skill Name | Current Skill Level | Skill Level Rating System | Date Of Accomplishment | Accomplishment Basis | Validation | Employee Comments |
|---|---|---|---|---|---|---|
| 522 C++ Skills | Intermediate | N-I-E-G | 06/15/XX | Course Completion - Organization XX Intermediate C++ Skills Training | - | Previous work project also provided this skill. |

530 Skill Level Change History For Selected Skill

| Skill Name | Skill Level | Date Of Accomplishment | Accomplishment Basis | Validation | Employee Comments |
|---|---|---|---|---|---|
| 532 C++ Skills | Intermediate | 06/15/XX | Course Completion - Organization XX Intermediate C++ Skills Training | - | Previous work project also provided this skill. |
| 534 C++ Skills | Intermediate | 03/01/XX | Self-Assessment | Supervisors: AA Peers: BB, CC Subordinates: DD | My experience on the LMN Project provided these skills. |
| 536 C++ Skills | Basic | 02/15/XY | Degree Completion – AA in Computer Studies | Supervisors: AA | Passed intro C++ class. |

*Fig. 5A*

Example Employee ZZ Competency Screen (cont'd)

540 — My Other Competencies

547 [New] 549 [Edit]

| | Competency Name | Parent Competency | Competency Category | Competency Parameter | Date Of Accomplishment | Competency Description | Criticality |
|---|---|---|---|---|---|---|---|
| 542 | A.A. Degree | Education | Credentials | Computer Studies | 02/01/XY | A.A. degree from XYZ Junior College | - |
| 544 | Past Project Experience | Experience | Experience | LMN Project | 02/20/XX | Spanish Reading | Medium |
| | ... | | | | | | |

550 — My Current Competency Gaps

557 [New] 559 [Edit]

| | Competency Name | Parent Competency | Competency Category | Current Skill Level | Target Skill Level | Gap Value | Planned Date Of Accomplishment | Criticality | Source |
|---|---|---|---|---|---|---|---|---|---|
| 552 | B.S. Degree | Education | Credentials | - | - | - | - | High | Current Work Position |
| 554 | C++ Skills | Progr. Skills | Skills | Intermediate | Expert | 5 | - | Medium | Performance Goal |
| 556 | HTML Skills | Web Skills | Skills | None | Basic | 20 | - | Medium | Manager Recommendation |
| 558 | Public Speaking | Communication | Capabilities | - | - | - | - | Low | Personal Goal |
| | ... | | | | | | | | |

560 — My Planned Competencies

| | Competency Name | Parent Competency | Competency Category | Planned Skill Level | Required Skill Level | Planned Date Of Accomplishment | Planned Basis Of Accomplishment | Competency Description |
|---|---|---|---|---|---|---|---|---|
| 562 | | | | | | | | |

*Fig. 5B*

Example Administrator Work Position Type Definition Screen

610 — Defined Organization Work Position Types

617 [New]  619 [Edit]

| | Work Position Type Name | Parent Work Position Type | Root Work Position Type | Summary Of Required Competencies | Summary Of Preferred Competencies |
|---|---|---|---|---|---|
| 612 | Intermediate Software Engineer | Software Engineer | Software Engineer | B.S. Degree: Computer Science; C++ Skills: Intermediate; ... | C++ Skills: Expert; ... |
| 614 | Senior Software Engineer – ABC Division | Senior Software Engineer | Software Engineer | C++ Skills: Expert; ... | ... |
| 616 | Senior Software Engineer – DEF Division | Senior Software Engineer | Software Engineer | C++ Skills: Intermediate; ... | C++ Skills: Expert; ... |
| | ... | | | | |

620 — Competency Details For Selected Work Position Type

627 [New]  629 [Edit]

| | Competency Name | Parent Competency | Competency Category | Skill Level Rating System | Required Skill Level | Date Required | Preferred Skill Level | Criticality |
|---|---|---|---|---|---|---|---|---|
| 622 | B.S. Degree | Education | Credentials | - | - | Start Date | - | High |
| 624 | C++ Skills | Progr. Skills | Tech. Skills | N-I-E-G | Intermediate | Start Date + 2 mos. | Expert | High |
| 626 | English Conversation | English | Lang. Skills | R-C-F-N | Conversant | Start Date | Fluent | Medium |
| 628 | XML Skills | Progr. Skills | Tech. Skills | N-I-E-G | - | - | Intermediate | Low |
| | ... | | | | | | | |

*Fig. 6B*

Example Employee ZZ Personalized Learning Recommendations

My Recommended Learning

710

| | Learning Activity | Associated Curriculum | Learning Type | Unfulfilled Prerequisites | Resulting Organization Competencies | Validation Needed | Related Competency Gaps | Gap Value | Value To Employee / Organization |
|---|---|---|---|---|---|---|---|---|---|
| 711 | *Organization XX C++ Expert-Level Training Course* | *C++ Skills Training for Senior SW Engineers* | *Course – Instructor-led* | *Online Exam – Advanced Programming Techniques* | *C++ Skills: Expert* | - | *C++ Skills: Expert* | *5* | *Medium / High* |
| 713 | Online Exam – Advanced Programming Techniques | *Prerequisite for Organization XX C++ Expert-Level Training Course* | Exam – Online | | | - | C++ Skills: Expert | 5 | Medium / Medium |
| 715 | C++ Expert-Level Online Course by Organization LL | - | Course – Web-based, Third-party | | C++ Skills: Expert | Supervisor | C++ Skills: Expert | 5 | Medium / Medium |
| 717 | XML Skills Training Curriculum | XML Skills Training Curriculum | Multi-Course Curriculum | | XML Skills: <Various> | - | XML Skills: Intermediate | 40 | Medium / Medium |
| 719 | Product TT Proficiency | Overview Of Product Line UU | Seminar or Self-Study | | Product TT Proficiency | - | - | - | Low / Medium |
| 721 | Presentation At Organization's Tech Luncheon Series | - | Experiential | | | - | Public Speaking | - | Medium / Low |
| ... | | | | | | | | | |

*Fig. 7A*

Example Employee ZZ Personalized Learning Scheduling

My Recommended Learning

710

| Learning Activity | Associated Curriculum | Learning Type | Unfulfilled Prerequisites | Resulting Organization Competencies | Validation Needed | Related Competency Gaps | Gap Value | Value To Employee / Organization |
|---|---|---|---|---|---|---|---|---|
| ... | | | | | | | | |
| C++ Expert-Level Online Course by Organization LL | - | Course – Web-based, Third-party | - | C++ Skills: Expert | Supervisor | C++ Skills: Expert | 5 | Medium / Medium |
| ... | | | | | | | | |

715

Training Catalog

730

| Learning Activity | Associated Curriculum | Learning Type | Prerequisites | Resulting Organization Competencies | Validation Needed | Start Date | Length | Price |
|---|---|---|---|---|---|---|---|---|
| C++ Expert-Level Online Course by Organization LL | - | Course – Web-based, Third-party | Intermediate C++ Skills | C++ Skills: Expert | Supervisor | 06/01/XX | 6 weeks – M-W 1pm-3pm | $200 |
| C++ Expert-Level Online Course by Organization LL | - | Course – Web-based, Third-party | Intermediate C++ Skills | C++ Skills: Expert | Supervisor | 08/01/XX | 6 weeks – M-W 1pm-3pm | $200 |
| C++ Expert-Level Online Course by Organization LL | - | Course – Web-based, Third-party | Intermediate C++ Skills | C++ Skills: Expert | Supervisor | 09/01/XX | 8 weeks – M-F 8am-9am | $200 |
| ... | | | | | | | | |

Example Employee ZZ Personalized Learning Scheduling Update

550 \ My Current Competency Gaps

557 [New]  559 [Edit]

| | Competency Name | Parent Competency | Competency Category | Current Skill Level | Target Skill Level | Skill Gap Value | Planned Date Of Accomplishment | Criticality | Source |
|---|---|---|---|---|---|---|---|---|---|
| 552 | B.S. Degree | Education | Credentials | - | - | - | - | High | Current Work Position |
| 554 | C++ Skills | Progr. Skills | Skills | Intermediate | Expert | 5 | 10/31/XX | Medium | Performance Goal |
| | ... | | | | | | | | |

560 \ My Planned Competencies

| | Competency Name | Parent Competency | Competency Category | Planned Skill Level | Required Skill Level | Planned Date Of Accomplishment | Planned Basis Of Accomplishment | Competency Description |
|---|---|---|---|---|---|---|---|---|
| 562 | C++ Skills | Progr. Skills | Skills | Expert | Expert | 10/31/XX | Course Completion – Web-based, Third-Party + Supervisor Validation | C++ Programming |

*Fig. 7C*

Example Employee ZZ Personalized Learning Completion Update

510 My Current Skills

517 New  519 Edit

| | Skill Name | Parent Skill | Root Skill Category | Current Skill Level | Skill Gap | Required Skill Level | Date Of Accomplishment | Skill Description | Criticality |
|---|---|---|---|---|---|---|---|---|---|
| 512 | C++ Skills | Progr. Skills | Tech. Skills | Expert | No | Expert | 10/29/XX | C++ Programming | Medium |
| 514 | Spanish Reading | Spanish | Lang. Skills | Fluent | No | Conversant | 01/01/XY | Spanish Reading | Low |

530 Skill Level Change History For Selected Skill

| | Skill Name | Current Skill Level | Date Of Accomplishment | Accomplishment Basis | Validation | Employee Comments |
|---|---|---|---|---|---|---|
| 531 | C++ Skills | Expert | 12/29/XX | Course Completion – C++ Expert-Level Online Course by Organization LL | Supervisors: AA | |
| 532 | C++ Skills | Intermediate | 06/15/XX | Course Completion – Organization XX Intermediate C++ Skills Training | | Even before my course completion, my previous project experience provided the requisite skills. |
| | ... | | | | | |

550 My Current Competency Gaps

| | Competency Name | Parent Competency | Competency Category | Current Skill Level | Target Skill Level | Skill Gap Value | Planned Date Of Accomplishment | Criticality | Source |
|---|---|---|---|---|---|---|---|---|---|
| 552 | B.S. Degree | Education | Credentials | - | - | - | - | High | Current Work Position |
| 556 | HTML Skills | Web Skills | Skills | None | Basic | 20 | - | Low-Med. | Manager Recommendation |
| | ... | | | | | | | | |

*Fig. 7D*

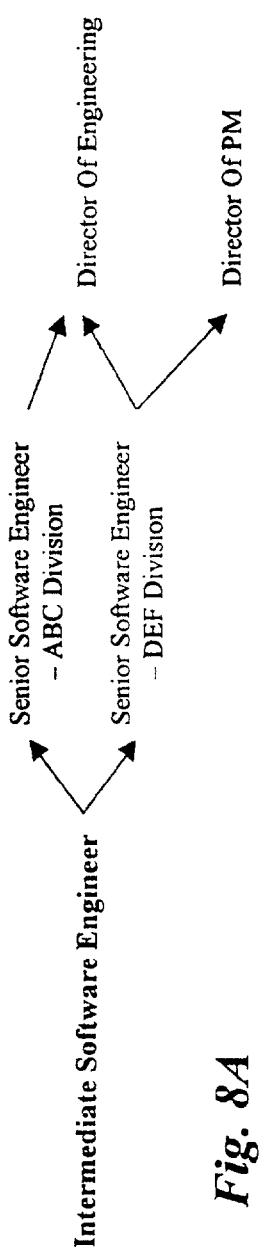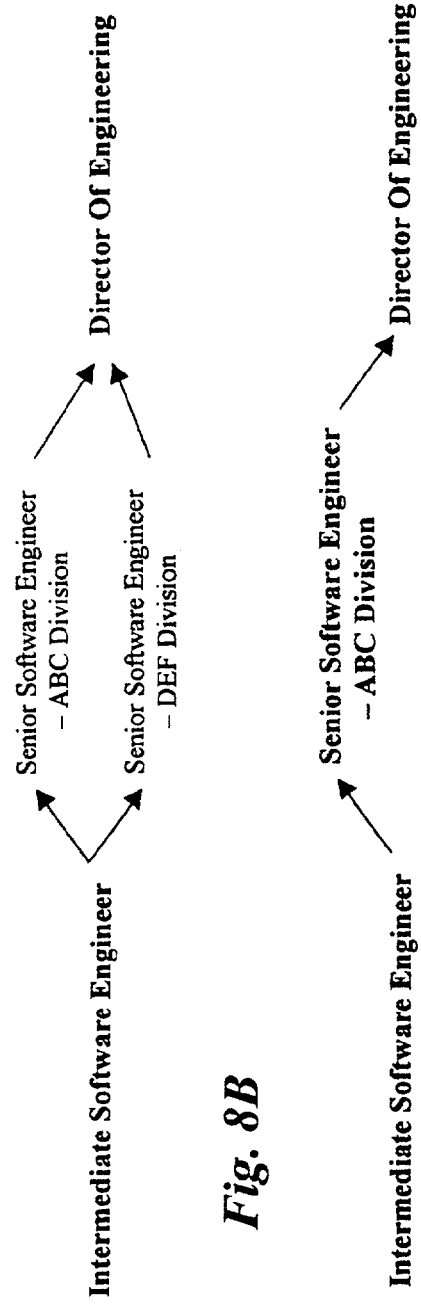
Fig. 8A
Fig. 8B
Fig. 8C

Example Future Career Path Management – Competencies Comparison Screen

810 My Current Competencies

| | Competency Name | Parent Competency | Competency Category | Current Skill Level | Competency Parameter | Date Of Accomplishment | Criticality |
|---|---|---|---|---|---|---|---|
| 812 | C++ Skills | Progr. Skills | Tech. Skills | Intermediate | - | 06/15/XX | Medium |
| 814 | A.A. Degree | Education | Credentials | - | Computer Studies | 02/01/XY | - |
| | ... | | | | | | |

820 Competency Gaps For Starting Work Position Type: Intermediate Software Engineer

| | Competency Name | Parent Competency | Competency Category | Skill Level Rating System | Required Skill Level | Date Required | Preferred Skill Level | Criticality |
|---|---|---|---|---|---|---|---|---|
| 822 | B.S. Degree | Education | Credentials | - | - | Start Date | - | High |
| | ... | | | | | | | |

830 Competency Gaps For Intermediate Work Position Type: Senior Software Engineer – ABC Division

| | Competency Name | Parent Competency | Competency Category | Skill Level Rating System | Required Skill Level | Date Required | Preferred Skill Level | Criticality |
|---|---|---|---|---|---|---|---|---|
| 832 | B.S. Degree | Education | Credentials | - | - | Start Date | - | High |
| 834 | C++ Skills | Progr. Skills | Tech. Skills | N-I-E-G | Expert | Start Date | - | Medium |
| | ... | | | | | | | |

840 Competency Gaps For Target Work Position Type: Director Of Engineering

| | Competency Name | Parent Competency | Competency Category | Skill Level Rating System | Required Skill Level | Date Required | Preferred Skill Level | Criticality |
|---|---|---|---|---|---|---|---|---|
| 842 | M.S. Degree or M.B.A. Degree | Education | Credentials | - | - | Start Date | - | Medium |

*Fig. 8D*

Example Manager Group Skill Management Screen – Current Competencies

910 — Group PP Enumerated Current Competencies And Competency Gaps

| | Competency Name | Current Skill Level | Competency Parameter | Current Number Of Group Members | Target Number Of Group Members | Gap | Average Date Of Accomplishment |
|---|---|---|---|---|---|---|---|
| 911 | C++ Skills | Expert | - | 2 | 3 | 1 | 04/15/XX |
| 913 | C++ Skills | Intermediate | - | 5 | 5 | 0 | 04/15/XX |
| 915 | C++ Skills | Basic | - | 2 | 1 | -1 | 04/23/XX |
| 917 | C++ Skills | - | - | 1 | 1 | 0 | - |
| 919 | B.S. Degree | | Computer Science | 4 | 5 | 1 | 01/12/XY |
| | ... | | | | | | |

920 — Group PP Aggregated Current Competencies And Competency Gaps

| | Competency Name | Average Current Skill Level (0-3) | Target Current Skill Level (0-3) | Gap | Competency Parameter | Number Of Group Members | Average Date Of Accomplishment |
|---|---|---|---|---|---|---|---|
| 922 | C++ Skills | 1.8 (Almost Intermediate) | 2 (Intermediate) | 0.2 | - | 10 | 04/17/XX |
| | ... | | | | | | |

*Fig. 9A*

Example Manager Group Skill Management Screen – Target Competencies

930 Group PP Enumerated Target Competencies And Resulting Competency Gaps
936 [New] 938 [Edit]

| | Competency Name | Current Skill Level | Competency Parameter | Current Number Of Group Members | Target Number Of Group Members | Gap | Average Anticipated Date Of Accomplishment |
|---|---|---|---|---|---|---|---|
| 931 | C++ Skills | Expert | - | 2 | 4 | 2 | 10/01/XX |
| 933 | C++ Skills | Intermediate | - | 5 | 5 | 0 | 10/01/XX |
| 935 | C++ Skills | Basic | - | 2 | 2 | 0 | 10/01/XX |
| 937 | C++ Skills | - | - | 1 | 0 | -1 | 10/01/XX |
| 939 | B.S. Degree | - | Computer Science | 4 | 5 | 1 | 08/30/XX |
| | ... | | | | | | |

950 Group PP Aggregated Target Competencies And Competency Gaps
957 [New] 959 [Edit]

| | Competency Name | Average Current Skill Level (0-3) | Average Target Skill Level (0-3) | Gap | Current Number Of Group Members | Target Number Of Group Members | Average Anticipated Date Of Accomplishment |
|---|---|---|---|---|---|---|---|
| 952 | C++ Skills | 1.8 (Almost Intermediate) | 2.5 (Intermediate-Expert) | 0.7 | 10 | 11 | 04/17/XX |
| | ... | | | | | | |

*Fig. 9B*

Example Manager Group Skill Management Screen – Target Competencies

960 — Group PP Member Target C++ Skill Levels  966 [New] 968 [Edit]

| Member | Current Skill Level | New Target Skill Level | Gap | Anticipated Date Of Accomplishment | Target Type | Validation |
|---|---|---|---|---|---|---|
| Employee HH | Expert | Expert | No | - | - | - |
| Employee II | Expert | Expert | No | - | - | - |
| Employee ZZ | Intermediate | Expert | Yes | 08/15/XX | Performance Goal | Supervisors: |
| Employee JJ | Intermediate | Intermediate | No | - | - | - |
| Employee KK | Intermediate | Expert | Yes | 010/15/XX | Required | - |
| ... | | | | | | |

970 — Group PP Member Target C++ Skill Levels  976 [New] 978 [Edit]

| Member | Average Current Skill Level (0-3) | Average New Target Skill Level (0-3) | Gap | Current Number Of Group Members | Target Number Of Group Members | Anticipated Date |
|---|---|---|---|---|---|---|
| Sub-Group QQ | 1.9 | 2.3 | 0.4 | 7 | 8 | 08/15/XX |
| Sub-Group RR | 2.1 | 2.2 | 0.1 | 6 | 5 | - |
| ... | | | | | | |

Example Competency-Based Employee Searching

Search:

Competency: [C++ Skills ▽]  With Skill Level: [Intermediate ▽]  With Accomplishment Basis: [<Any> ▽]
With Accomplishment Date Between: [<Any>] & [04/01/XX]  With Validation: [<Any> ▽]  ...
　　　　　And●　　Or○　　And Not○

Competency: [C++ Skills ▽]  With Skill Level: [Basic ▽]  With Accomplishment Basis: [Not Self-Assessment ▽]
With Accomplishment Date Between: [01/01/XY] & [<Any>]  With Validation: [At Least Supervisor ▽]  ...
　　　　　And●　　Or○　　And Not○

Competency: [Leadership ▽]  With Accomplishment Date Between: [<Any>] & [<Any>]  ...
　　　　　And●　　Or○　　And Not○

...

Search Results:

Employee BB
Employee ZZ
Employee CC
...

Rank By:  Skill Level: ○   Accomplishment Basis: ○   Earliest Accomplishment Date: ●   Latest Accomplishment Date: ○  ...

*Fig. 10A*

Example Competency-Based Employee Search Result Comparison

1010 — C++ Skill Level: Intermediate

| | Employee | Date Of Accomplishment | Accomplishment Basis | Validation |
|---|---|---|---|---|
| 1012 | Employee BB | 02/15/XX | Course Completion – Intermediate C++ Skills Training, Third-Party Web-based | Supervisors: FF |
| 1014 | Employee ZZ | 03/01/XX | Self-Assessment | Supervisors: AA Peers: BB, CC Subordinates: DD |
| | | 06/15/XX | Course Completion – Organization XX Intermediate C++ Skills Training | - |
| | ... | | | |

1020 — C++ Skill Level: Basic

| | Employee | Date Of Accomplishment | Accomplishment Basis | Validation |
|---|---|---|---|---|
| 1022 | Employee ZZ | 02/15/XY | Degree Completion – AA in Computer Studies | Supervisors: AA |
| 1024 | Employee BB | 04/01/XY | Online Exam – Organization XX Basic C++ Skills Exam | Supervisors: FF |
| | ... | | | |

MANAGING FUTURE CAREER PATHS

TECHNICAL FIELD

The following disclosure relates generally to using competency-related information for individuals to provide a variety of benefits, and more particularly to using competency-related information to assist in managing future career paths of individuals, such as for employees of an organization.

BACKGROUND

Many organizations track information about themselves and their members, and use that information for a variety of purposes. For example, business organizations will typically track payroll-related information about employees (e.g., their salaries and Social Security Numbers), and may also track other work-related information for at least some employees (e.g., their current work positions and various biographical information such as accomplishments and degrees). Organizations increasingly employ various software applications to assist in the tracking of such information, as well as with the managing of interactions between the organization and other parts of the enterprise (e.g., customers, partners, suppliers, distributors, employees, etc.).

While organizations will occasionally store limited information about the competencies of their members (e.g., a list of members that are trained in CPR or that speak a particular foreign language), such organizations do not typically track and use such information in an organized and integrated manner so as to provide significant benefits to the organization or to its members. For example, organizations do not typically track a full range of competencies of differing types for it members, nor do they typically track a history of changes in members' competencies. Moreover, organizations do not typically track missing competencies that have been identified for members, nor use such information to assist the members in improving their current competencies.

Accordingly, it would be beneficial to track a variety of competency-related information for individuals such as members of organizations, and to use such information to provide various benefits to the individuals and/or organizations.

BRIEF DESCRIPTION OF THE DRAWINGS

FIGS. 5A-5C illustrate examples of competency-related information that can be tracked and used for employees of a business organization.

FIGS. 6A-6B illustrate examples of competency-related information that is defined for an organization.

FIGS. 7A-7D illustrate examples of receiving and using personalized learning recommendations.

FIGS. 8A-8E illustrate examples of using competency-related information as part of career path management activities.

FIGS. 9A-9D illustrate examples of managing the competencies of a group of multiple employees.

FIGS. 10A-10B illustrate an example of searching for employees using competency-related information and comparing employees based on such information.

DETAILED DESCRIPTION

I. Introduction

Figure 1:
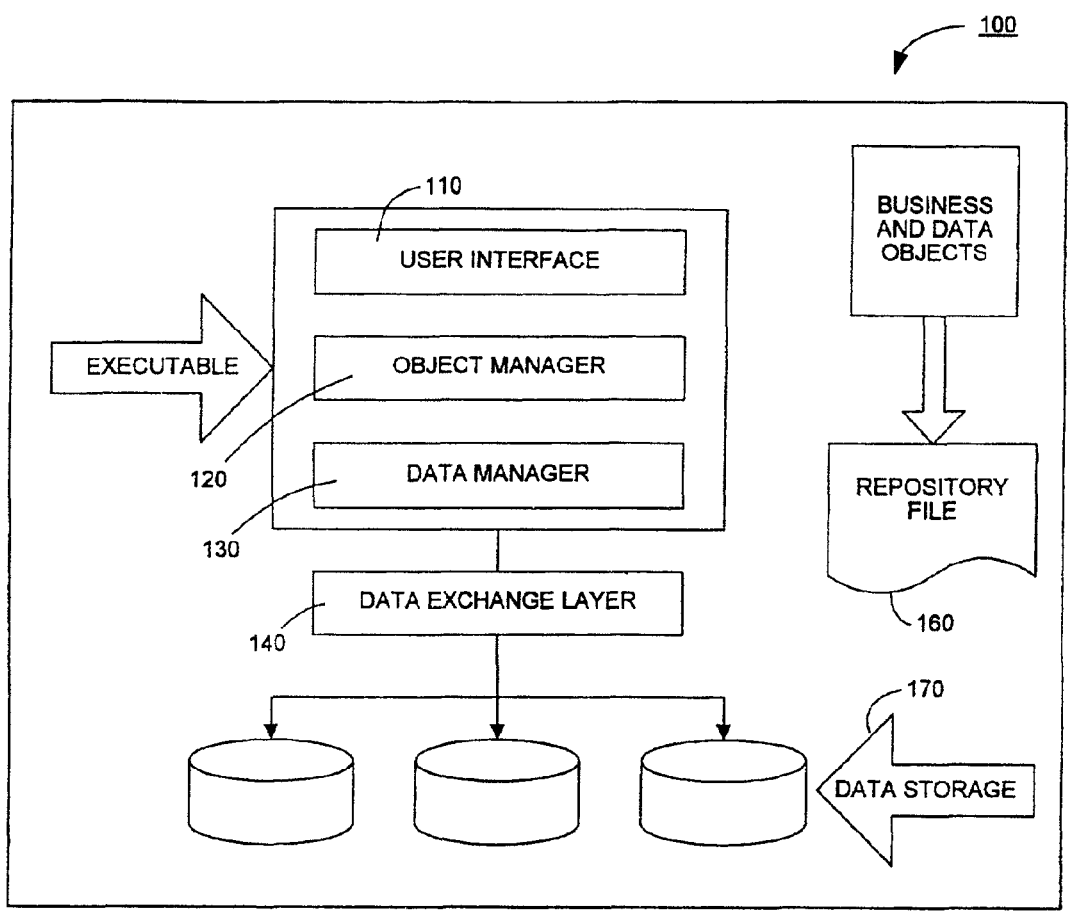
FIG. 1 shows a multi-layered system architecture within which the described techniques can be implemented.

A software facility is described below that tracks various competency-related information for individuals and uses such competency-related information to provide a variety of benefits. In some embodiments, the individuals are members of an organization (e.g., employees of a business organization), and the software facility is used by the organization to provide a variety of benefits to the organization and its members.

In particular, in some embodiments a history of changes that occur in individuals' competencies is tracked, such as new competencies that are attained by the individuals and/or changes in skill levels (or "proficiency levels") for existing competencies. A variety of additional information related to such competency changes may also be determined and tracked, such as times at which the changes occurred and/or a basis for each of the competency changes (e.g., completion of a course that provided a resulting competency). The competency change history information can then be used to provide a variety of benefits. For example, when such competency change information is tracked for members of an organization, it can be used by others to more accurately identify members of interest (e.g., members who have had a specified current skill level of a competency for at least a specified period of time and who attained a specified prior skill level of that competency by completion of an appropriate training course) and/or to compare such members (e.g., to rank members having a specified current skill level of a competency based on the length of time that they have had that skill level and/or on the basis for their achieving of that skill level).

In addition, in some embodiments gaps are identified between current competencies of individuals and target competencies for those individuals, and the individuals are provided with assistance in reducing or eliminating those competency gaps. The target competencies for an individual can be identified in a variety of ways, such as in an automatic manner based on required or preferred competencies for a current organizational position held by an individual. After identifying one or more competency gaps for an individual, the facility can automatically identify training courses or other learning activities that if completed or performed by the individual would reduce or eliminate those competency gaps. The facility can also automatically detect the completion or performance of at least some such learning activities by individuals (e.g., training courses provided by an organization of which the individual is a member), and if so will automatically update the current competency information and resulting competency gap information for those individuals.

In some embodiments, target competencies for members of an organization are identified at least in part based on information specified by appropriate other members of the organization (e.g., supervisors or group managers). For example, a manager of a group in an organization can specify aggregate target competencies for the group, and can view information about resulting competency gaps for the group. The facility can then assist the manager in generating a plan to reduce the group competency gaps in various ways, such as by identifying particular group members that are responsible for reducing or eliminating at least portions of the competency gaps and/or by searching for new potential group members whose current or planned competencies would similarly reduce or eliminate such competency gaps.

The competency-related information tracked by the facility can also assist members of an organization in managing future career paths within the organization. For example, in some embodiments the organization will have one or more defined networks of related position types for that organization, with an appropriate defined network indicating the future position types to which a current position type can lead. Thus, an organization member can specify a starting position type (e.g., the position type of the current position of the member) and a target future position type, and the facility can identify one or more possible career paths that lead from the starting position type to the target future position type (e.g., through one or more intermediate position types). When the position types have associated required competencies, the facility can also identify the competency gaps that exist for the member relative to each position type along the career path and/or between each pair of adjacent position types along the career path. After competency gaps are identified, actions to reduce those competency gaps can be identified for possible inclusion in a future action plan for the member. The facility can also provide other career management functionalities, including identifying other position types to consider (e.g., based on current or planned competencies of the member), providing links to openings for positions of future position types as the member becomes qualified for them, and providing various other types of information about future position types.

II. System Overview and Overall Architecture

In one embodiment, a computing system with which the facility is integrated can be logically structured as a multi-layered architecture as shown in FIG. 1. In particular, the logical multi-layered architecture as shown in FIG. 1 provides a platform for common services to support various applications. These services may include a user interface layer 110, an object manager layer 120, a data manager layer 130, and a data exchange layer 140.

The user interface layer 110 may provide the applets, views, charts and reports associated with one or more applications. In one embodiment, various types of clients can be supported via the user interface layer 110. These various types of clients may include traditional connected clients, remote clients, thin clients over an intranet, Java thin clients or non-Windows-based operating systems, HTML clients over the Internet, etc.

The object manager layer 120 may be designed to manage one or more sets of business rules or business concepts associated with one or more applications and to provide the interface between the user interface layer 110 and the data manager layer 130. In one embodiment, the business rules or concepts can be represented as business objects. The business objects may also be designed as configurable software representations of the various business rules or concepts, such as accounts, contacts, opportunities, service requests, solutions, etc.

The data manager layer 130 may be designed to maintain logical views of the underlying data and to allow the object manager to function independently of underlying data structures or tables in which data are stored. In one embodiment, the data manager 130 may also provide certain database query functions such as generation of structure query language (SQL) in real-time to access the data. In one embodiment, the data manager 130 is designed to operate on object definitions in a repository file 160 that define the database schema. The data storage services 170 provide the data storage for the data model associated with one or more applications.

The data exchange layer 140 may be designed to handle the interactions with one or more specific target databases and to provide the interface between the data manager layer 130 and the underlying data sources.

Figure 2:
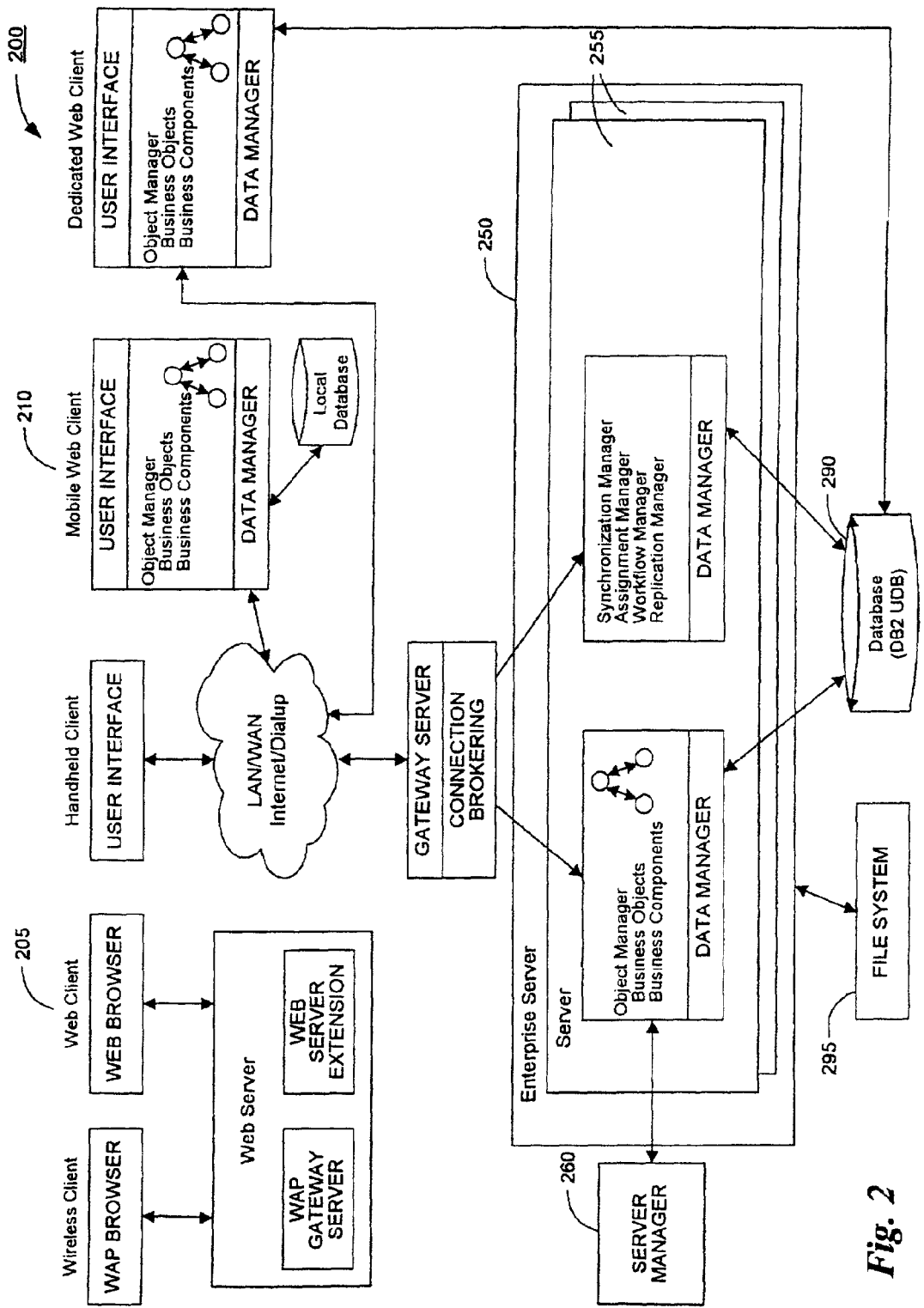
FIG. 2 shows a block diagram of one embodiment of a system configuration in which the described techniques can be implemented.

FIG. 2 shows a block diagram of one embodiment of a computing system configuration in which the facility can operate. In particular, the illustrated multi-layered architecture allows one or more software layers to reside on different machines. For example, the user interface, the object manager, and the data manager may all reside on the dedicated Web clients. For other types of clients such as the wireless clients, the object manager and data manager may reside on a system server. It should be appreciated and understood by one skilled in the art that the system configuration shown in FIG. 2 is for illustrative and explanative purposes, and may vary depending upon the particular implementations and applications of the described techniques.

In one embodiment, the system environment illustrated in FIG. 2 may include more than one database 290, and one or more subsets of the database can be created or replicated by a replication manager. In addition, mobile Web clients can have additional remote databases (also called local databases). In one embodiment, unless the remote or local databases associated with the mobile Web clients are defined as read-only databases, these mobile Web clients can create and update data locally that will be ultimately propagated up to the primary database when each mobile Web client synchronizes with the system server.

In one embodiment, the database 290 is designed to store various types of data including predefined data schema (e.g., table objects, index objects, etc.), repository objects (e.g., business objects and components, view definitions and visibility rules, etc.), and users' and customers' data. Dedicated Web clients and server components, including those that operate in conjunction with the other types of clients, may connect directly to the database 290 and make changes in real-time. In addition, mobile Web clients may download a subset of the server's data to use locally, and periodically synchronize with the server database through the system server to update both the local and the server database.

In some embodiments, various tables included in the database 290 may be logically organized into the following types: data tables, interface tables, and repository tables, etc. In addition, data tables may be used to store user business data, administrative data, seed data, and transaction data, etc. In one embodiment, these data tables may be populated and updated through the various applications and processes. Data tables may also include the base tables and the intersection tables, etc. In one embodiment, base tables may contain columns that are defined and used by the various applications. In one embodiment, the base tables are designed to provide the columns for a business component specified in the table property of that business component. In one embodiment, intersection tables are tables that are used to implement a many-to-many relationship between two business components. They may also hold intersection data columns, which store information pertaining to each association. In one embodiment, intersection tables provide the data structures for association applets.

In one embodiment, interface tables are used to denormalize a group of base tables into a single table that external programs can interface to. In one embodiment, they may be used as a staging area for exporting and importing of data.

In one embodiment, repository tables contain the object definitions that specify one or more applications regarding:
    the client application configuration;
    the mapping used for importing and exporting data; and
    rules for transferring data to mobile clients.

In one embodiment, the file system 295 is a network-accessible directory that can be located on an application server. In one embodiment, the file system 295 stores the physical files created by various applications, such as files created by third-party text editors, and other data that is not stored in the database 290. In one embodiment, physical files stored in the file system 295 can be compressed and stored under various naming conventions. In one embodiment, dedicated Web clients can read and write files directly to and from the file system 295. In one embodiment, mobile Web clients can have a local file system, which they synchronize with the server-based file system 290 periodically. In one embodiment, other types of client such as the wireless clients and the Web clients can access the file system 290 via the system server.

In one embodiment, the enterprise server 250 is a logical grouping of the system servers 255 that share a common table owner or a database, point to a common gateway server, and can be administered as a group using server manager 260. In one embodiment, the connection to the gateway server can be established via TCP/IP. In one embodiment, the enterprise server 250 can be scaled effectively by deploying multiple system servers 255 in the enterprise server 250, thus providing a high degree of scalability in the middle tier of applications.

In one embodiment, the server 255 runs one or multiple server programs. It handles the incoming processing requests and monitors the state of all processes on the server. In one embodiment, server programs are designed and configured to perform one or more specific functions or jobs including importing and exporting data, configuring the database, executing workflow and process automation, processing to support mobile Web clients for data synchronization and replication, and enforcing business rules, etc. In one embodiment, the server 255 can be an NT Service (under Windows NT operating system) or a daemon (e.g., a background shell process) under UNIX operating system. In one embodiment, the server 255 supports both multi-process and multi-threaded components and can operate components in batch, service, and interactive modes.

In one embodiment, the server manager 260 is configured as a utility that allows common control, administration and monitoring across disparate programs for the servers 255 and the enterprise server 250. In one embodiment, the server manager 260 can be used to perform the following tasks: start, stop, pause, and resume servers 255, components, and tasks; monitor status and collect statistics for multiple tasks, components, and servers within an enterprise server; and configure the enterprise server, individual servers, individual components, and tasks, etc.

In one embodiment, the gateway server can be configured as a logical entity that serves as a single entry point for accessing servers. In one embodiment, it can be used to provide enhanced scalability, load balancing and high availability across the enterprise server. In one embodiment, the gateway server may include a name server and a connection brokering component. In one embodiment, the name server is configured to keep track of the parameters associated with the servers. For example, the availability and connectivity information associated with the servers can be stored in the name server. The various components in the system can query the name server for various information regarding the servers' availability and connectivity. In a Windows NT environment, the name server can be run as a NT service. In a UNIX environment, the name server can run as a daemon process. In one embodiment, the connection brokering component is used to perform load balancing functions such as directing client connection requests to an appropriate server (e.g., the least-busy server).

In one embodiment, as illustrated in FIG. 2, the various types of clients that can be supported by the system may include the following clients: dedicated Web clients, mobile Web clients, Web clients, wireless clients, and handheld clients, etc.

In one embodiment, dedicated Web clients (also called connected clients) are connected directly to a database server for data access via a LAN or WAN connection. In one embodiment, these connected or dedicated Web clients do not store data locally. These dedicated Web clients can also access the file system directly. In one embodiment, the user interface, the object manager, and the data manager layers of the multi-layered architecture reside on the dedicated Web client.

In one embodiment, the mobile Web clients are designed and configured for local data access and thus can have their own local database and/or local file system. In one embodiment, mobile Web clients can interact with other components within the system via the gateway server. Through synchronization, the modifications from the local database and the server database can be exchanged.

In one embodiment, a Web client runs in a standard browser format from the client's machine. In one embodiment, the Web client can connect to a system server 255 through a Web server. In one embodiment, the system server 255 is designed and configured to execute business logic and access data from the database 290 and file system 295. In one embodiment, the Web client described herein is designed and configured to operate in an interactive mode. In one embodiment, the interactive Web client framework as described herein utilizes dynamically created objects implemented in JavaScript on the browser side that correspond to objects on the server side. In one embodiment, these dynamically created objects on the browser side may include the current view and its corresponding applets, the current business object and the corresponding business components, etc.

In one embodiment, wireless clients are essentially thin clients enabled on wireless devices. The wireless clients can use a wireless application protocol (WAP)-based user interface to communicate and exchange information/data with the system server.

Figure 3:
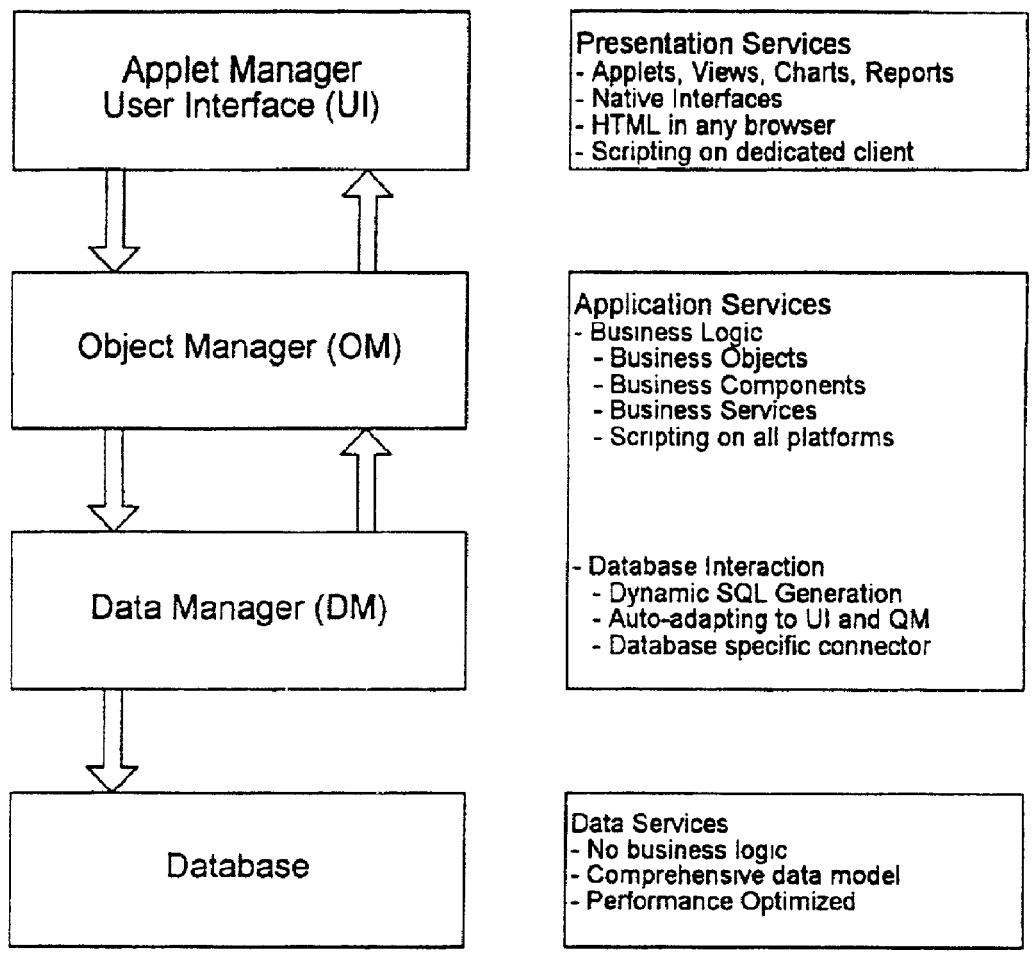
FIG. 3 shows a block diagram illustrating a logical representation of a multi-layered architecture within which the described techniques can be implemented.

FIG. 3 shows a block diagram illustrating another logical representation of a multi-layered architecture. Again, the multi-layered architecture as illustrated in FIG. 3 provides the configured platform for various common services designed and to support the various applications. In one embodiment, these various services may include presentation services which correspond to an applet manager and user interface layer, application services which correspond to an object manager (OM) layer and a data manager (DM) layer, and data services which correspond to a database layer.

In one embodiment, the presentation services may be designed and configured to support various types of clients and may provide them with user interface applets, views, charts, and reports, etc. As described above, a large variety of clients may be supported including wireless clients, handheld clients, Web clients, mobile Web clients, and dedicated (connected) clients, etc.

In one embodiment, the application services may include business logic services and database interaction services. In one embodiment, business logic services provide the class and behaviors of business objects and business components. In one embodiment, database interaction services may be designed and configured to take the user interface (UI) request for data from a business component and generate the database commands (e.g., SQL queries) necessary to satisfy the request. For example, the data interaction services may be used to translate a call for data into DBMS-specific SQL statements.

In one embodiment, data storage services may be designed and configured to provide the data storage for the underlying data model which serves as the basis of the various applications. For example, the data model may be designed and configured to support various software products and applications including call center, sales, services, and marketing, etc., as well as various industry vertical products and applications such as eFinance, eInsurance, eCommunications, and eHealthcare, etc.

Figure 4:
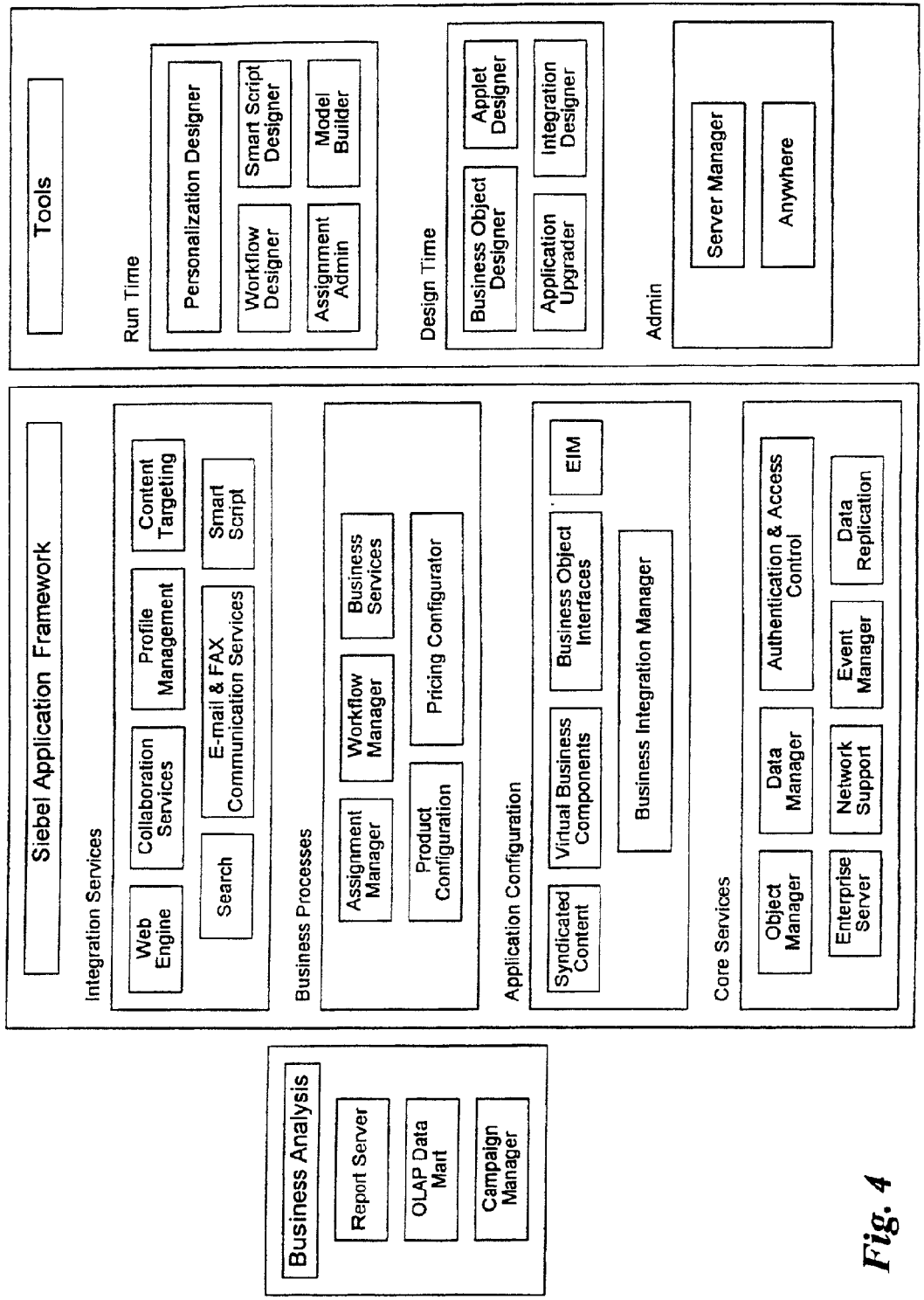
FIG. 4 illustrates a block diagram of one embodiment of an application framework within which the described techniques can be implemented.

FIG. 4 illustrates a block diagram of one embodiment of an application framework. As illustrated in FIG. 4, the application framework may include various logical groupings of various types of services and various types of tools that can be used to design and configure particular applications based on business needs and environments.

In one embodiment, the core services are designed and configured to provide the framework in which the applications execute. In one embodiment, the core services may include the following:
    the enterprise server, which is the middle-tier application server;
    the networks that link all of these pieces together;
    facilities like event manager and data replication, which allow sharing data between multiple installations of various applications as well as between the various applications and other external applications; and
    the authentication and access control, the security facilities.

In one embodiment, application integration services may be designed and configured to allow the various applications built in accordance with this framework to communicate with the external world. In one embodiment, the various types of services in this logical grouping may be designed and configured to provide for real-time, near-real-time, and batch integration with external applications. For example, these integration services may be used to enable communications between external applications and the internal applications using available methods, technologies, and software products. In one embodiment, application integration services allow the systems or applications to share and replicate data with other external enterprise applications. Accordingly, these services allow a particular application or system to be both a client requesting information and a server having information requested from it.

In one embodiment, business processes services are designed and configured to allow the client to automate business processes through the application. In one embodiment, these various business process services may include the following:
    assignment of tasks through Assignment Manager;
    enforcement of business practices through Workflow Manager;
    reuse of custom business logic through Business Services; and
    ensuring proper product configuration and pricing through the Product Configurator and Pricing Configurator.

In one embodiment, creation of these business processes can be done through Run-Time tools such as Personalization Designer, Workflow Designer, SmartScript Designer, Assignment Administration Views, the Model Builder, etc.

In one embodiment, integration services may be designed and configured to provide the client with user interface and thin client support. In one embodiment, these may include capabilities for building and maintaining Web-based applications, providing Web support facilities such as user Profile Management, Collaboration Services and Email and Fax services, as well as advanced Smart Scripting, etc.

In one embodiment, design time tools may be designed and configured to provide the services to customize, design, provide integration points, and maintain the application. These various tools provide one common place to define the application.

In one embodiment, admin services are designed and configured to provide one place to monitor and administer the application environment. In one embodiment, these services allow the user to administer the application either through a graphic user interface (GUI) or from a command line.

III. Examples and Additional Details

For illustrative purposes, some embodiments of the software facility are described below in which specific types of competencies are tracked and used by employees of business organizations. However, those skilled in the art will appreciate that the techniques of the invention can be used in a wide variety of other situations, and that the invention is not limited to use with employees of business organizations or with the illustrated types of competencies.

As one example of competency-related information that may be tracked and used for employees of a business organization, consider the information illustrated for an example Employee ZZ of an Organization XX in FIGS. 5A and 5B. In the illustrated embodiment, Organization XX makes a variety of information available to employees via a Web-based portal for the organization, and Employee ZZ has selected to review his competency-related information. As is shown in section 505 of the resulting screen of information, in this illustrated example Employee ZZ holds a current work position within the organization that has the unique identifier of 2347, with that work position being of a defined work position type for the organization of "Intermediate Software Engineer". There are also various other sections of competency-related information for Employee ZZ that are illustrated on the screen, including a section 510 illustrating current skills, a section 520 illustrating details about a selected one of the current skills, a section 530 indicating history information for skill level changes for that selected skill, a section 540 indicating non-skill competencies of the employee, a section 550 indicating current competency gaps of the employee, and a section 560 indicating planned competencies of the user.

Figure 5C:
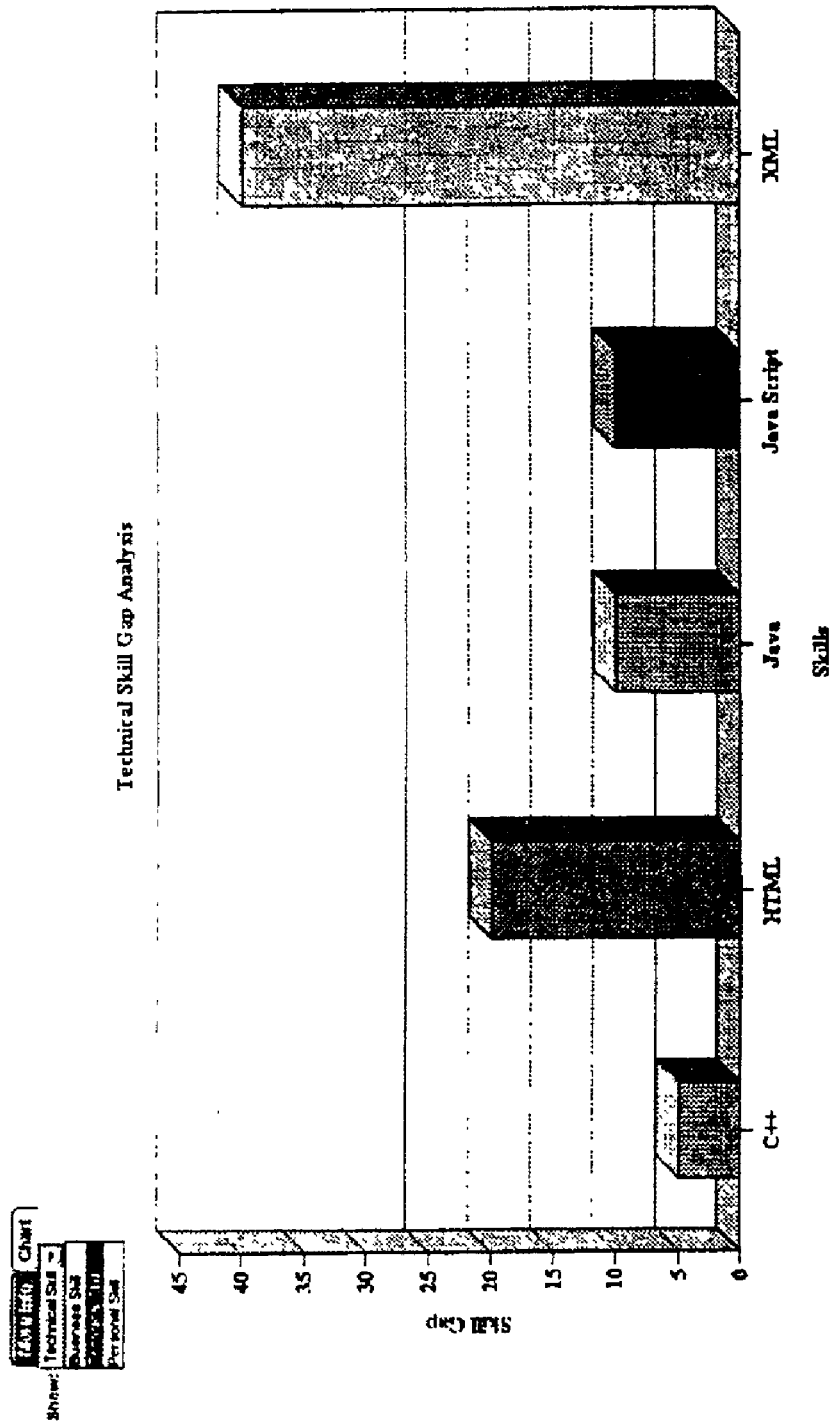
Figure 6A:
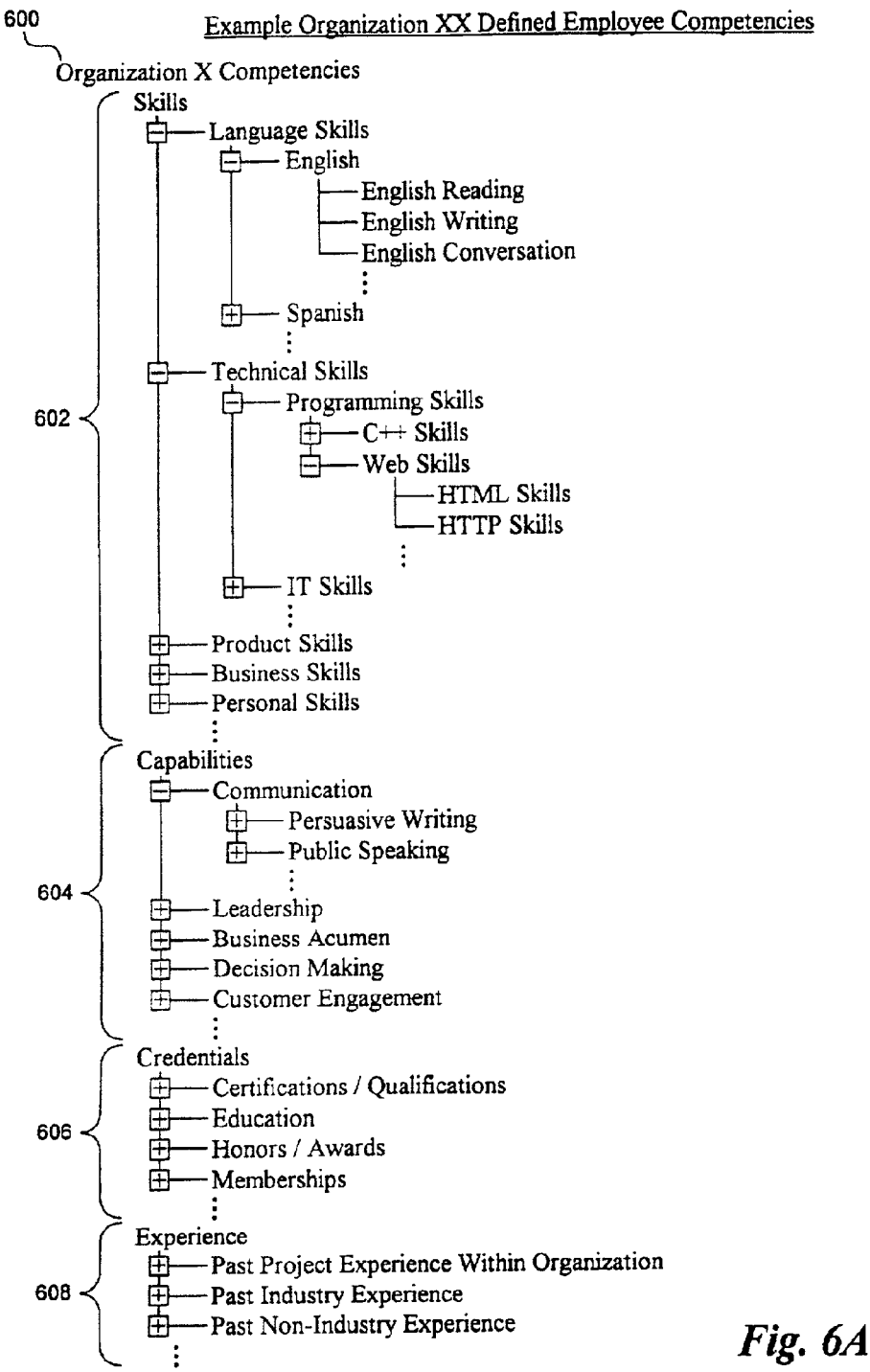

To provide a context for the competency-related information presented in FIGS. 5A and 5B, FIG. 6A illustrates an example of various defined competencies that have been previously specified for the organization. In particular, in the illustrated embodiment an administrative user (or "administrator") for the organization has defined a competency hierarchy 600 for the organization, such as by modifying a default competency hierarchy provided by a third-party. The hierarchy in the illustrated embodiment can be defined to any depth desired by the administrative user. While competencies may be represented in a variety of ways, in the illustrated embodiment the competencies are hierarchically arranged in at least four competency groupings, those being a group 602 of various skills, a group 604 of various capabilities, a group 606 of various credentials, and a group 608 of various experiences. Competencies are selected to be grouped with the skills if they are attributes that have multiple corresponding skill levels amenable to measurement. Capabilities, conversely, are qualities which a person is determined to possess or not possess, but do not have multiple associated skill levels. Credential and experience competencies similarly do not have multiple associated skill levels, but may have associated parameters in the illustrated embodiment (e.g., a Masters of Science degree credential could have an associated parameter indicating the field of study or an associated class rank). Those skilled in the art will appreciate that competencies can be defined in other ways in other embodiments (e.g., a competency categorized as a capability for one organization could be categorized as a skill for another organization, or other organizations may not differentiate between different types of competencies in this manner), and can include a variety of types of information not illustrated or instead may lack some of the illustrated information.

In the illustrated embodiment, after specifying the competency hierarchy, an administrative user then assigns competency-related information to defined work positions and to learning activities that are available to employees. More generally, each business organization may have a variety of work position types that have been defined for the organization, with multiple filled work positions and work position openings sharing a single defined work position type. Each work position type can have one or more associated competencies, which in the illustrated embodiment can be defined as being required or preferred. In addition, for each competency associated with a work position type that is a skill, there is also a corresponding rating system having multiple defined skill levels (e.g., "Novice", "Intermediate" and "Expert", or integers 1-5) that is associated with that work position type. While not illustrated here, in some embodiments an administrative user may define an arbitrary number of rating systems with arbitrary skill levels, and associate any combination of skill and rating system to any work position type. In addition, while also not illustrated here, in some embodiments particular work positions of a defined type may be defined to have associated competencies that vary from the competencies associated with the defined type, such as defining a competency that is merely preferred for the defined type to be required for a particular work position.

FIG. 6B illustrates an example screen with which an administrative user may define mappings of competency-related information to work position types, including a section 610 with various defined work position types for the organization and a section 620 with additional details about a selected one of the work position types. In particular, section 610 of FIG. 6B illustrates various defined work position type entries 612-616, and includes summaries of required and preferred competencies for each work position type. The illustrated embodiment also includes information about a position of the work position type in a corresponding hierarchy of work position types (not illustrated), such as may be used for inheritance or sharing of associated competency information (e.g., some of the associated competencies for the work position type of "Senior Software Engineer—ABC Division" may be inherited from its parent work position type of "Senior Software Engineer"). Section 610 also includes interactive controls 617 and 619 to allow the administrative user to add new work position types or to edit existing ones.

The work position type illustrated in entry 614 has been selected (illustrated in this example embodiment by the entry being shown in italicized form), and thus the section 620 provides additional details about the competencies mapped to that work position type. Four competencies are shown for the selected work position type in entries 622-626, with each entry providing information about the position of that competency in the defined competency hierarchy as well as a corresponding criticality of the competency for the work position type. For the competencies that are skills, a skill level rating system is also specified, and a required and/or preferred skill level from that rating system is also shown for the skill. Section 620 also includes interactive controls 627 and 629 to allow the administrative user to add or edit competencies for the selected work position type. Those skilled in the art will appreciate that in other embodiments a variety of additional types of competency-related information could be specified and/or shown, or that various illustrated types of information may instead not be specified and/or shown.

While not illustrated, the administrator can also associate competencies and rating systems (for skill-based competencies) with each of various learning activities available to employees, and can then specify skill levels that are expected to result from or possibly result from performance or completion of the learning activities by employees. Such learning activities can take a variety of forms, as discussed in greater detail below, including training courses and exams offered by the organization as well as learning activities provided by a known third-party, such as over the Web. Administrators can also specify a variety of other types of information related to learning activities, such as various prerequisites for a learning activity and/or multiple learning activities to be associated together (e.g., in a specified order) as a curriculum.

Figure 6C:
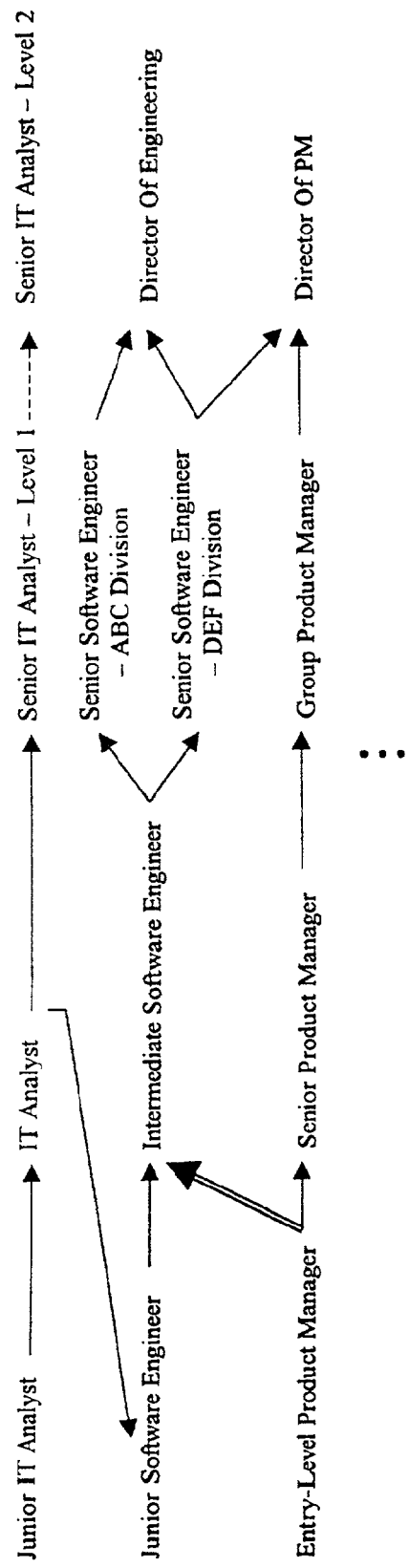
FIG. 6C illustrates an example of a network of related work position types that is defined for an organization.

In addition to defining competencies and rating systems and associating them with work position types and learning activities, an administrative user in the illustrated embodiment can also define one or more networks of relationships between work position types. FIG. 6C illustrates an example of a portion of a work position type network for the engineering portion of the organization. A variety of work position types are illustrated, and arrows are shown to indicate defined relationships between those work position types. Most relationships in the illustrated embodiment, shown here with an arrow with a single solid line, indicate that employees in a work position of a defined type are eligible to be promoted to positions of other defined work position types if arrows to those other work position types are shown from the first work position type. Thus, for example, in the illustrated embodiment an employee having a position of the defined "Junior IT Analyst" work position type is eligible to be promoted to a next work position type of "IT Analyst", but not to a next work position type of "Junior Software Engineer". As is shown, some work position types may have multiple alternatives for next work position types, such as the "Intermediate Software Engineer" type. A variety of interactive controls (not shown) may also allow an administrative user to add work position types and define relationships.

In addition, in the illustrated embodiment an administrative user can specify additional types of restrictions between work position types. For example, employees with a current work position of the type "Entry-Level Product Manager" are eligible to be promoted to the engineering-track work position of the type "Intermediate Software Engineer", but only if they receive approval of the appropriate Director of Engineering. The existence of this additional restriction for that work position type transition is shown in the illustrated embodiment by an arrow with double lines. As another example, the "Senior IT Analyst—Level 1" work position type is intended to be a final work position type from which there is not a regular career path advancement track. However, a select few employees in that position may eventually be elevated to the "Senior IT Analyst—Level 2" work position type if they are selected by a special review panel. The existence of this special work position type transition is shown in the illustrated embodiment by an arrow with a dashed line. Those skilled in the art will appreciate that in other embodiments, no additional restrictions may be imposed for work position type transitions other than the competencies associated with the future work position type, or that a variety of other types of restrictions may be imposed.

Returning now to FIG. 5A, a variety of competency-related information for Employee ZZ will now be discussed. As previously noted, section 510 includes various skill-based competency information for Employee ZZ. In particular, skills are shown in entries 512 and 514, and the skill in entry 512 with the name "C++ Skills" has been selected. Section 510 also includes interactive controls 517 and 519 in the illustrated embodiment to allow Employee ZZ to modify his own skill set, although in some embodiments some modifications (e.g., additions of new skills or skill levels) may need validation or other approval before taking effect. Some or all of the skills may also have associated criticality values, such as to show the importance of the possession of the skill to the employee (e.g., based on the current work position type) and/or to the organization.

Section 520 illustrates additional details for the selected skill, including not only a current skill level of Employee ZZ but also information about the achievement of that skill level. The skill level achievement information in the illustrated embodiment includes the date on which the skill level was achieved and a basis for the employee to have been rated as having that skill level, which in this example was completion of a course provided by Organization XX. In this example, the completed internal course was previously defined by an administrative user as providing an Intermediate skill level for the "C++ Skills" competency and as not requiring any additional validation. In addition, information such as the date of accomplishment and accomplishment basis was automatically added in this example to Employee ZZ's competency-related information upon completion of the course, such as by receiving that information from a learning module for the organization.

A history of skill level changes is also tracked for at least some skills in the illustrated example, and section 530 shows a skill level change history for the selected skill. Entries 532-536 of the section each show a previous change that occurred with respect to the skill for Employee ZZ. For example, Employee ZZ first attained a Basic skill level for the selected skill by completing an A.A. degree and then receiving a validation approval from his supervisor as possessing the Basic skill level. After later completing an internal project for Organization XX, Employee ZZ believed his skill level had progressed to a Intermediate level, and thus performed a corresponding self-assessment that was later approved by appropriate other employees in a 360 degree review. However, as Organization XX places a higher value on skills that are attained via courses than they do for those attained via self-assessments, Employee ZZ later completed an internal course that further validated his possession of an Intermediate skill level for the skill.

Section 540 summarizes a variety of non-skill competency information for Employee ZZ, which in other embodiments may be stored and/or presented in other manners (e.g., in a format more closely resembling a resume, or by separating credential, experience and capability information). While not illustrated, in some embodiments one of the competencies may be selected in a manner similar to that for the current skills, and corresponding additional details and/or competency change information may be presented for the selected competency. Section 540 also includes interactive controls in a similar manner to section 510. In other embodiments, information about skills and other competencies may be presented in an integrated manner.

Section 550 provides a variety of information about current competency gaps for Employee ZZ, with those gaps based on target competencies for Employee ZZ that are not among the current competencies of Employee ZZ. In this example, four competency gaps in entries 552-558 are illustrated. As shown by the Source field, such competency gaps (and their corresponding target competencies) can have a variety of sources, including required skills for Employee ZZ's current work position, performance or other goals set for Employee ZZ (e.g., as part of a yearly review process), explicit recommendations or requirements from his manager (e.g., of a useful skill that he might want to consider, such as to benefit himself and/or to provide additional aggregate skills to a group to which Employee ZZ belongs), and personal interests or goals of Employee ZZ that have been specified. In the illustrated embodiment, each competency gap has an associated criticality value, with the competency gaps presented in a ranked order based on those criticality values. These criticality values can be determined in a variety of ways, such as by being provided by the source of the competency gap (e.g., the "B.S. Degree" competency being a requirement for Employee ZZ's current work position with a High level of criticality), based on the source itself (e.g., Personal Goals having by default a Low criticality), etc.

Section 560 provides information about planned competencies of Employee ZZ, such as based on learning activities that have been scheduled, explicit competency goals that have been set, or a defined plan to reduce current competency gaps. In this example, Employee ZZ does not currently have any planned competencies.

FIG. 5C illustrates an alternative view of competency gap information for Employee ZZ, with the illustrated example focusing on technical skill gaps. As an alternative to presenting competency gap information in a table format ranked by criticality, such a chart can provide information showing a degree or amount of a gap relative to some performance measure, such as a defined requirement or a comparison to other comparable employees (e.g., those having work positions of the current or a future work position type). While not illustrated, a variety of interactive controls may also be provided to allow Employee ZZ to manipulate and modify the chart.

FIGS. 7A-7D illustrate examples of Employee ZZ receiving and using personalized learning recommendations. In particular, with respect to FIG. 7A, Employee ZZ is presented with a variety of learning recommendations illustrated in entries 711-721 of section 710, such as in response to a request for such information. In the illustrated embodiment, the personalized learning recommendations are based on gaps between Employee ZZ's current competencies and various target competencies that have been identified for him. For example, entries 711-715 correspond to a competency gap between Employee ZZ's current skill level of "Intermediate" for the "C++ Skills" competency and a target skill level of "Expert" for that competency, with the entries providing different options that can each be used by Employee ZZ to eliminate that competency gap. The learning activities can be of various types (e.g., courses internal to Organization XX, courses external to the organization, exams, self-study, experiential activities that provide learning by doing, etc.), and in the illustrated embodiment various related information such as unfulfilled prerequisites and associated curriculums is shown. As the learning activity in entry 711 has an unfulfilled prerequisite, in the illustrated embodiment it is displayed in a manner so as to differentiate it from the other entries (in a shaded or dimmed manner in this example) and is not selectable by Employee ZZ. In the illustrated embodiment, each of the learning activities also has associated values to the employee and the organization that can be determined in a variety of ways (e.g., based on the corresponding competency gaps and the importance of the source of those gaps), and the illustrated learning activities are ranked in the order of those values.

As is illustrated in FIG. 7B, Employee ZZ has selected the learning activity training course shown in entry 715 as a potential activity to be performed, and in response the system provides a variety of corresponding training catalog information in section 730 of the screen. In particular, information about particular upcoming instances of the selected training course are shown. In this example, the course instance shown in entry 731 conflicts with one or more other scheduled activities of Employee ZZ (e.g., based on information stored in his calendar or schedule), and thus that course instance is illustrated in a distinct manner from the course instances that do not have a conflict. After reviewing the illustrated information, Employee ZZ determines that he will take the course instance shown in entry 735, and selects that entry for registration.

After Employee ZZ has completed the scheduling of the course instance, various competency-related information for Employee ZZ is automatically updated. For example, as is shown in FIG. 7C, the planned competencies of Employee ZZ are updated to reflect the new competency that is expected to result from the scheduled training course, including a planned accomplishment date for the new competency based on the schedule for the course.

FIG. 7D provides an example of how competency-related information for Employee ZZ is automatically updated after completion of the training course. In particular, Employee ZZ's current skills are updated to show the new "Expert" skill level for the "C++ Skills" competency, and the skill level change history information is updated in a corresponding manner to show the date and basis for the new skill level. In addition, the previously existing competency gap for Employee ZZ based on the lack of the "Expert" skill level has now been eliminated. In this example, validation from Employee ZZ's supervisor AA was required to confirm the new competency, and so that validation was automatically solicited from that supervisor upon completion of the training course. After that validation was received, the illustrated changes to Employee ZZ's competency-related information take effect.

FIGS. 8A-8E illustrate examples of Employee ZZ performing career path management activities that use various competency-related information. In particular, with respect to FIG. 8A, Employee ZZ is presented with a network of work position types that begins with the current work position type of Employee ZZ (in this example, "Intermediate Software Engineer"), such as in response to a request for such information. In some embodiments, a variety of interactive controls (not shown) will be provided, such as to select a starting work position type for career planning purposes that is different from the current work position type of Employee ZZ.

As shown in FIG. 8B, in this example Employee ZZ selects the work position type of "Director Of Engineering" as a possible goal for a future target work position type. In response to that selection, the system in the illustrated embodiment determines the possible career paths from the starting work position type to the selected target work position type, and displays those possible career paths. In this example, two such possible career paths are available. In FIG. 8C, Employee ZZ then selects one of the two possible career paths, and in response the system presents a variety of competency-related information for that selected career path in FIG. 8D.

In particular, in this example the system presents information in FIG. 8D about competency gaps for Employee ZZ for each of the work position types along the selected career path. The illustrated competency gap screen includes a section 810 that shows existing competencies for Employee ZZ, and sections 820, 830 and 840 illustrate competency gaps for Employee ZZ corresponding to each of the three work position types along the selected career path. For example, section 820 illustrates competency gaps between Employee ZZ's current competencies and the required competencies for Employee ZZ's current work position type. As would be expected, the competency gaps increase in section 830 when the requirements for the next work position type along the career path are considered, and further increase in section 840 when the requirements for the final target work position type at the end of the selected career path are considered.

Figure 8E:
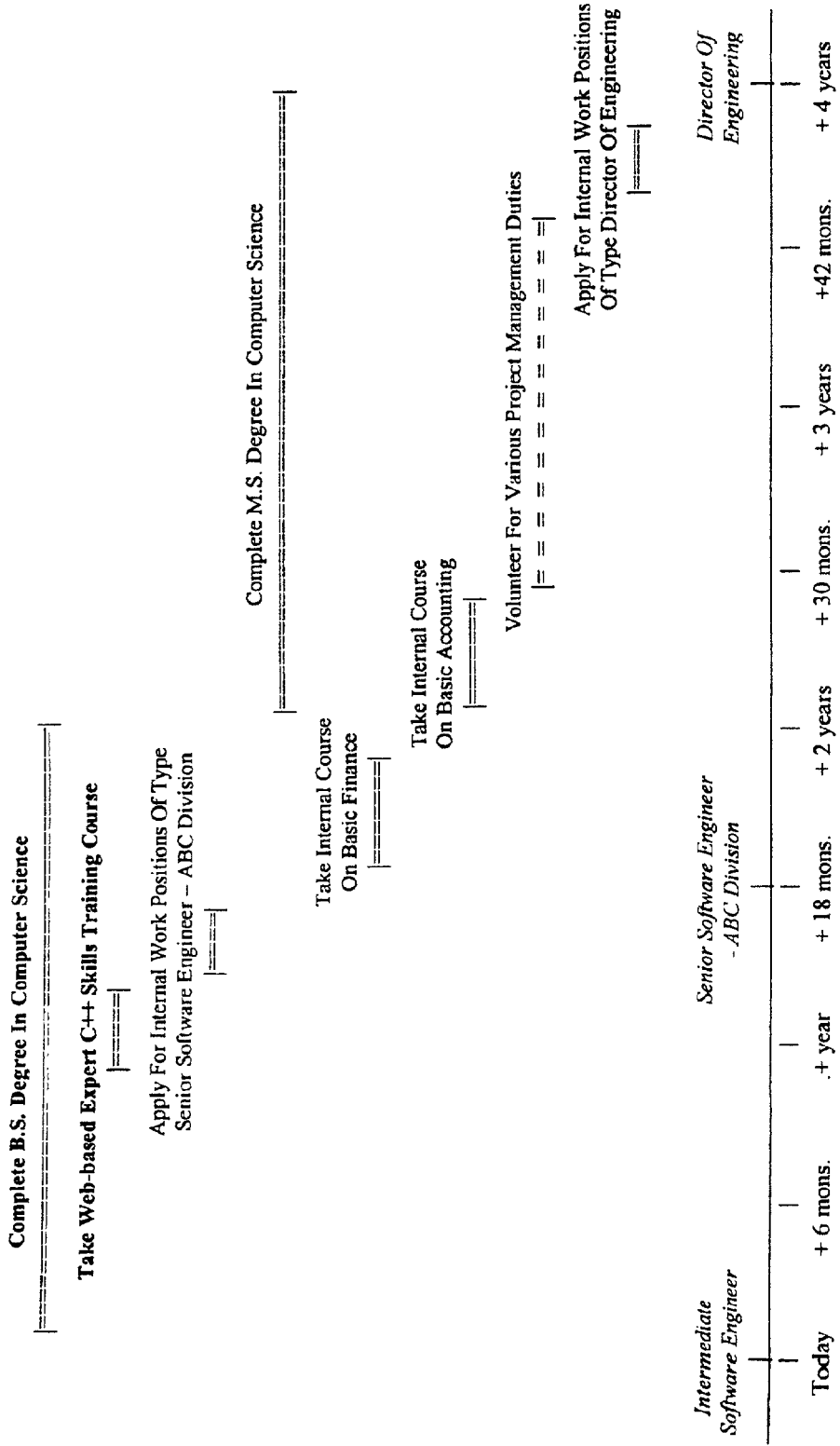

After presenting the competency gap information to Employee ZZ, the system then assists Employee ZZ in developing an action plan to manage his future career so as to be qualified for the target work position type within a specified period of time. In particular, FIG. 8E illustrates a time-based action plan that includes suggestions for a variety of actions over time that will eliminate or reduce the competency gaps along the career path. In the illustrated embodiment, the system also ranks the actions according to importance for Employee ZZ, and provides indications of the most important actions (illustrated here in bold format). For example, the first two suggested actions are to complete a B.S. degree and to achieve an "Expert" skill level for the "C++ Skills" competency, as both of those would eliminate significant competency gaps for the next work position type along the career path. After achieving the "Expert" skill level and mostly completing the degree, the system recommends that Employee ZZ begin applying for internal work positions of type "Senior Software Engineer—ABC Division", with the plan being for Employee ZZ to receive such a position within 18 months from the current time.

In addition to merely suggesting actions that eliminate competency gaps, the system can also suggest additional actions that would improve the chances or opportunities of Employee ZZ to be offered a work position type along the career path, such as for gaining business-related skills and project management experience in preparation for a work position as a "Director Of Engineering". As with other such functionalities provided to users, in an least some embodiments a variety of interactive controls will also be provided to allow Employee ZZ to modify the suggested action plan and/or to create a different action plan.

FIGS. 9A-9D illustrate examples of managing the competencies of a group of multiple employees. In particular, in the illustrated example a manager of a Group PP having multiple employees can view various information about the current competency-related information for the group. For example, as shown in section 910, in some embodiments the manager may view enumerations of each competency held by at least one group member, as well as information such as the number of group members that possess that competency and an average date on which those group members achieved that competency. Section 920 provides a different view of group competency information by aggregating the competency information for the various group members together and providing a summary view of the group competency information. For example, in this illustrated embodiment information is aggregated about all of the different skill levels for the "C++ Skill" competency that are held by the group members, and an aggregated average skill level value (based on assigning integers 0-3 to skill levels "None", "Basic", "Intermediate" and "Expert") for that competency is calculated.

In addition to viewing information about current competencies of the group, sections 910 and 920 also provide information about current target competencies for the group and about competency gaps that result from differences between the current actual competencies and the current targets. The current target information in the illustrated embodiment also includes targets for numbers of group members that should have a specified competency (e.g., 3 group members having an "Expert" skill level for the "C++ Skills" competency) as well as targets for an average skill level for a specified skill.

While not illustrated here, in some embodiments the manager can also view detailed competency-related information for each of the group members, such as the information illustrated with respect to FIGS. 5A-5C. Similarly, the manager may be able to perform career path management activities for each of the group members, and provide corresponding recommendations to the member, such as of future work position types to consider and/or of target competencies that would help prepare the group member for future work position types.

FIG. 9B illustrates that the manager can also explicitly specify target information for the group, and view information about the competency gaps that would result between the current group competencies and those specified target competencies. As with the existing competency and competency gap information, this specified target information can include values for enumerated competencies, for aggregate competencies, and/or for numbers of group members.

After target information has been specified, FIGS. 9C and 9D provide examples of ways in which the manager can act to reduce or eliminate competency gaps that result from the specified target information. In particular, FIG. 9C corresponds to a situation in which the members of the group are employees (e.g., for a first-level group in an organizational hierarchy), and in which summary information is illustrated for each of the group members for a specified competency or competency gap (in this example, for the "C++ Skills" competency). As shown in FIG. 9B, in this example a gap exists for group members that possess an "Expert" skill level for the competency, with the group being short two such members. In order to eliminate this competency gap, the manager reviews competency-related information for the group members, and specifies the "Expert" skill level as a target competency for two group members that do not currently possess that skill level (in this example, Employees ZZ and KK, as shown in entries 965 and 969 of section 960). In this manner, the manager distributes (or "rolls down") the required competencies to selected group members in such a manner that it becomes the responsibility of those group members to each satisfy the portion of the required competency that was given to them and to thus reduce or eliminate the corresponding competency gap.

FIG. 9D illustrates a situation similar to that illustrated in FIG. 9C, but in which some or all of the group members are themselves groups (e.g., for a higher-level group in an organizational hierarchy). As with group members that are individuals, the manager can distribute portions of the target competencies and their corresponding competency gaps to the group members. However, since the group members receiving the target competencies are themselves groups, those target competencies can be further distributed to the members of those groups. In the illustrated embodiment, this further distribution can be performed by the higher-level manager that initiated the original distribution, or instead by a lower-level manager that is responsible for the sub-group that received distributed target competency information.

FIGS. 10A-10B illustrate an example of searching for employees using competency-related information and of comparing employees based on such information. In particular, as illustrated in FIG. 10A, any of the competency-related information for individuals that was previously discussed can be used as the basis of a search, such as various skill level history change information (e.g., accomplishment basis and/or accomplishment date) for current or previous skill levels. When multiple employees are found to match the search criteria, they can be presented in various ways, such as in a ranked manner based on a variety of criteria. In the illustrated embodiment, interactive controls are illustrated that can be used to re-rank search results based on a specified ranking criteria.

FIG. 10B illustrates one example of multiple individuals being compared based on their competency-related information, such as some or all of the individuals that are identified as part of the search results for a search. In the illustrated embodiment, for each of the competencies used as part of the search, information for each of the various employees that was identified during the search is presented in a ranked manner for that competency. Full competency information for some or all of the employees could also be retrieved and displayed, and multiple employees can be compared in a variety of other ways.

Figure 11:
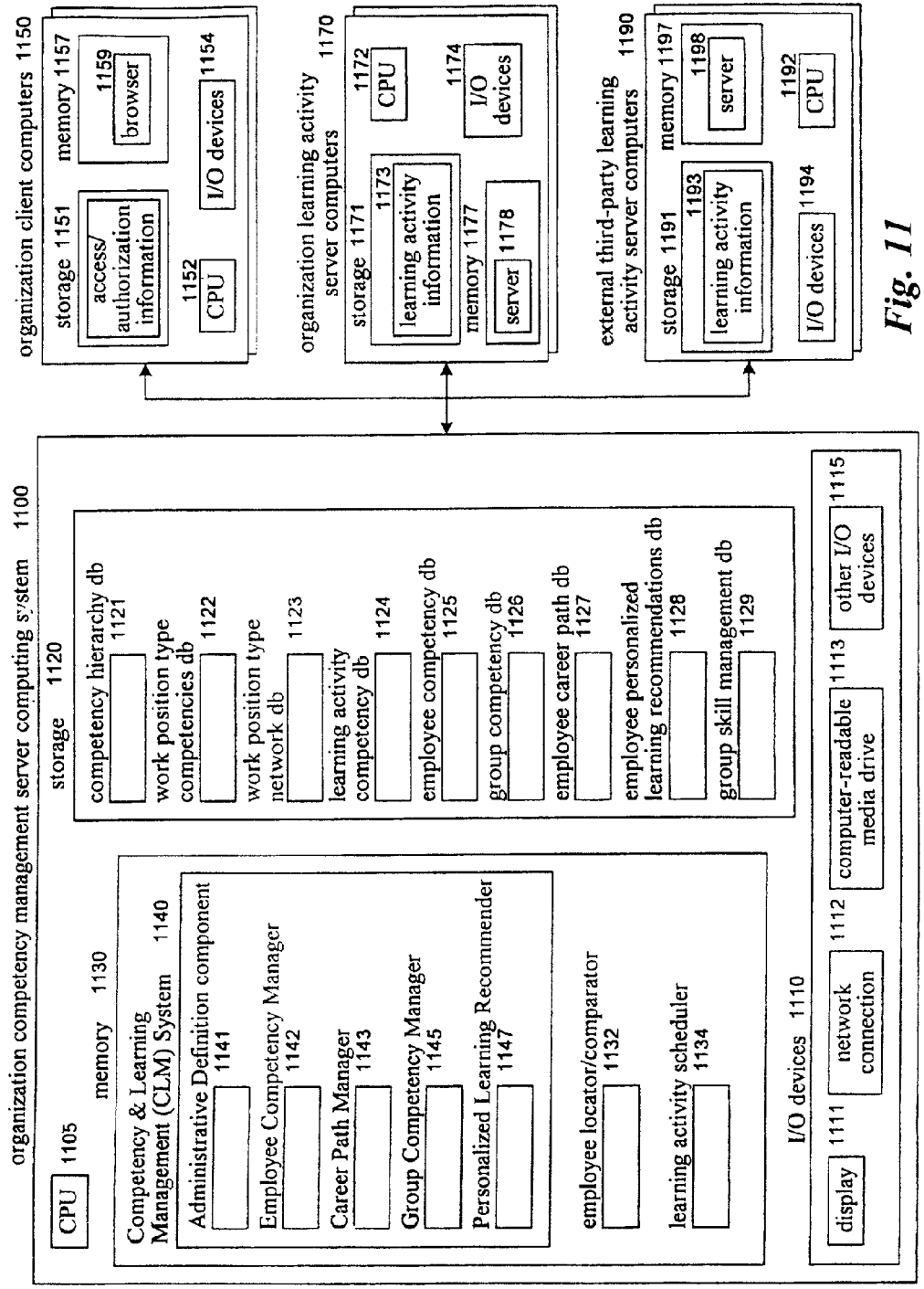
FIG. 11 is a block diagram illustrating an embodiment of a computing system suitable for providing the described techniques.

FIG. 11 illustrates a computing system suitable for executing an embodiment of a Competency and Learning Management (CLM) system facility capable of implementing the described techniques. In particular, an organization competency management server computing system 1100 is illustrated that provides various competency-related and learning-related functionality to users within an organization, and various organization client computers 1150 are illustrated from which such users can interact with the competency management server. In addition, various server computers are available in the illustrated embodiment to provide learning activity information (e.g., online courses or exams) to users of the client computers, including one or more organization learning activity server computers 1170 and one or more third-party external Web server computers 1190.

The competency management server includes a CPU 1105, various I/O devices 1110, storage 1120, and memory 1130. The I/O devices include a display 1111, a network connection 1112, a computer-readable media drive 1113, and various other I/O devices 1115. An embodiment of the CLM system 1140 is executing in memory, and it includes an Administrative Definition component 1141, an Employee Competency Manager component 1142, a Career Path Manager component 1143, a Group Competency Manager component 1145, and a Personalized Learning Recommender component 1147. Various other software modules may also be executing in memory to provide functionalities to users, including an employee locator/comparator component 1132 and a learning activity scheduler component 1134.

As discussed in greater detail below, the CLM system can provide various functionalities to users, and may be accessed by users in a variety of ways. For example, some users may have physical access to the competency management server, and if so may use the I/O devices 1110 to interact with the CLM system. Alternatively, other users may use the client computer systems 1150 to remotely access the CLM system (e.g., via the World Wide Web, such as over an intranet and/or the Internet). Such users may include employees accessing the system on their own behalf, managers accessing the system on behalf of groups which they manage or with which they are otherwise associated, and/or administrators accessing the system for maintenance and configuration purposes.

One or more administrative users may initially access the CLM system to define various competency-related and learning-related information for the organization, such as by modifying default information supplied with the CLM system or by creating such information in an independent fashion. In particular, such administrative users access the Administrative Definition component in order to provide a variety of configuration information related to the organization. For example, in the illustrated embodiment administrative users define a hierarchy of competencies which is stored in a database 1121 on storage, and then associate appropriate competencies with work position types defined for the organization and with learning activities available to users in the organization. The resulting work position type competency information and learning activity competency information are stored in databases 1122 and 1124 on storage respectively. The administrator could also define and store a variety of rating systems (not shown) that each include multiple skill levels, and further associate a rating system together with a competency that is associated with a defined work position type and/or a defined learning activity. An administrative user can also define one or more work position type networks for the organization to show inter-relationships between different work position types, such as which work position types can lead to other work position types as well as associated restrictions on such transitions. The resulting work position type networks are stored in a database 1123 on storage.

In addition to the competency-related configuration information supplied by the administrators, various employee competency information and group competency information is also stored in databases 1125 and 1126 on storage respectively. In some embodiments, an administrator may define appropriate competency information for each new employee that joins the organization, and could similarly assign competency-related information to groups when they are created or modified. Alternatively, employees themselves could define their own competency information upon joining an information, and subsequently any changes to that competency information could be automatically tracked by the CLM system. Similarly, group competency information could be automatically generated based on aggregations of competency information for employees that are members of the group, with such information either calculated in advance of its use (e.g., on a periodic basis or after each change to an employee's competencies) and maintained on storage, or instead dynamically generated when needed.

In the illustrated embodiment, employees may view and modify their own competency-related information. In particular, employees interact with the Employee Competency Manager component to specify various competency-related information, including modifications to their current competencies, target competencies (e.g., required competencies based on a work position or desired competencies based on personal interests), planned competencies (e.g., competencies which the employee plans to acquire), competency gaps to be corrected, and/or skill level history information about past changes in skill levels. Employees that are using organization client computers may perform such interactions with the CLM system via a Web browser 1159 (e.g., by accessing an employee relationship management section of a Web portal for the organization) executing in memory 1157 of a client computer, while in other embodiments other types of software (e.g., software specific to the CLM system, such as proprietary software) could instead be used for CLM system interactions. In addition to memory 1157, the illustrated client computers each include a CPU 1152, various I/O devices 1154 and storage 1151. In some embodiments, the storage may contain various employee-specific information, such as access or authorization information needed to retrieve information from the CLM system, as well as calendar or schedule information (not shown) for an employee that may be used when scheduling future learning activities.

Employees can also access other CLM system functionality by interacting with other system components. For example, employees can perform career path management activities by interacting with the Career Path Manager component. These career path management activities of an employee may take a variety of forms, including the following: viewing information about their current work position type and about one or more other work position types of interest; viewing possible career paths (that may include one or more intermediate work position types) from their current or a specified starting work position type to a specified target work position type; specifying one or more target work position types as defined goals for use in determining a future action plan for execution by the employee to progress to that target work position type; and viewing and modifying such an action plan so as to interactively manage their career. The employee can also specify a timeline for their action plan, and use that timeline in scheduling required or desirable learning activities or other actions to be performed by the employee to reach their work position goal. Career path management information for employees is stored in the employee career path information database 1127 on storage.

Employees can also interact with the Personalized Learning Recommender component to receive personalized learning recommendations based on competency gaps, such as competency gaps between their current competencies and the competencies that are required or preferred for their current work position type. Recommendations for learning activities can also be generated to reduce or eliminate competency gaps that result from target competencies independent of a current work position type (e.g., target competency gaps that are related to a future career path and/or are based on recommendations or requirements specified by a supervisor). The personalized learning recommendation information for employees is stored in a database 1128 on storage in the illustrated embodiment, but could instead be generated dynamically when needed in other embodiments.

Employees can also access the CLM system other than to use their own competency-related information, such as managers that wish to perform various planning or management activities with respect to employees or groups that they supervise or manage. For example, managers can use the Group Skill Manager component to view current competencies of one or more groups which they supervise (as well as competency-related information for individual employees within such groups), and can specify target competencies for their groups or employees. After specifying target group competencies, the Group Skill Manager component presents the manager with information about competency gaps between the current competencies of the group and the target competencies of the group, and allows the manager to specify actions to correct the competency gaps. For example, the manager can specify members of the group who are responsible for correcting competency gaps for the group and/or can attempt to identify new potential group members who possess current and/or planned competencies that would reduce or eliminate competency gaps for the group. When the group members to which target competencies or competency gaps are distributed by a manager are themselves groups, that manager or a manager for those other groups can similarly assign target competencies or competency gaps to be corrected to members of those groups in a recursive fashion. Group skill management information is stored for the group in database 1129 on storage in the illustrated embodiment, but could instead be stored individually for each group member in other embodiments.

Employees can also use other modules that interact with the CLM system in order to receive other functionalities. For example, users can interact with the employee locator/comparator component to identify employees having specified competencies, competency gaps, skill levels and/or skill level histories, and can compare two or more employee with respect to any such competency-related information. In addition, employees can interact with the learning activity scheduler component to identify, schedule and participate in available learning activities. The learning activity scheduler component can obtain information about available learning activities from the learning activity server computers 1170 and 1190, which in the illustrated embodiment store learning activity information 1173 and 1193 respectively on their storages 1171 and 1191. The illustrated learning activity servers also each include an executing server 1178 or 1198 in memory to provide learning activity information to the learning activity scheduler component and/or to the client computers, and each include a CPU 1172 or 1192 and various I/O devices 1174 or 1194.

Those skilled in the art will appreciate that the computing devices and computer systems 1100, 1150, 1170 and 1190 are merely illustrative and are not intended to limit the scope of the present invention. In particular, a "client" or "server" may comprise any combination of hardware and/or software that can interact and perform some or all of the described functionality, including computers, network devices, internet appliances, PDAs, wireless phones, pagers, electronic organizers, television-based systems and various other consumer products that include inter-communication capabilities. The devices and systems may also be connected to other devices that are not illustrated, including through one or more networks such as the Internet or via the World Wide Web. In addition, the functionality provided by the illustrated system components may in some embodiments be combined in fewer components or distributed in additional components. Similarly, in some embodiments the functionality of some of the illustrated components may not be provided and/or other additional functionality may be available.

Those skilled in the art will also appreciate that, while various items are illustrated as being stored in memory or on storage while being used, these items or portions of them can be transferred between memory and other storage devices for purposes of memory management and data integrity. Alternatively, in other embodiments some or all of the software modules and/or components may execute in memory on another device and communicate with the illustrated computing device via inter-computer communication. Some or all of the system components or data structures may also be stored (e.g., as instructions or structured data) on a computer-readable medium, such as a hard disk, a memory, a network, or a portable article to be read by an appropriate drive. The system components and data structures can also be transmitted as generated data signals (e.g., as part of a carrier wave) on a variety of computer-readable transmission mediums, including wireless-based and wired/cable-based mediums. Accordingly, the present invention may be practiced with other computer system configurations.

Figure 12:
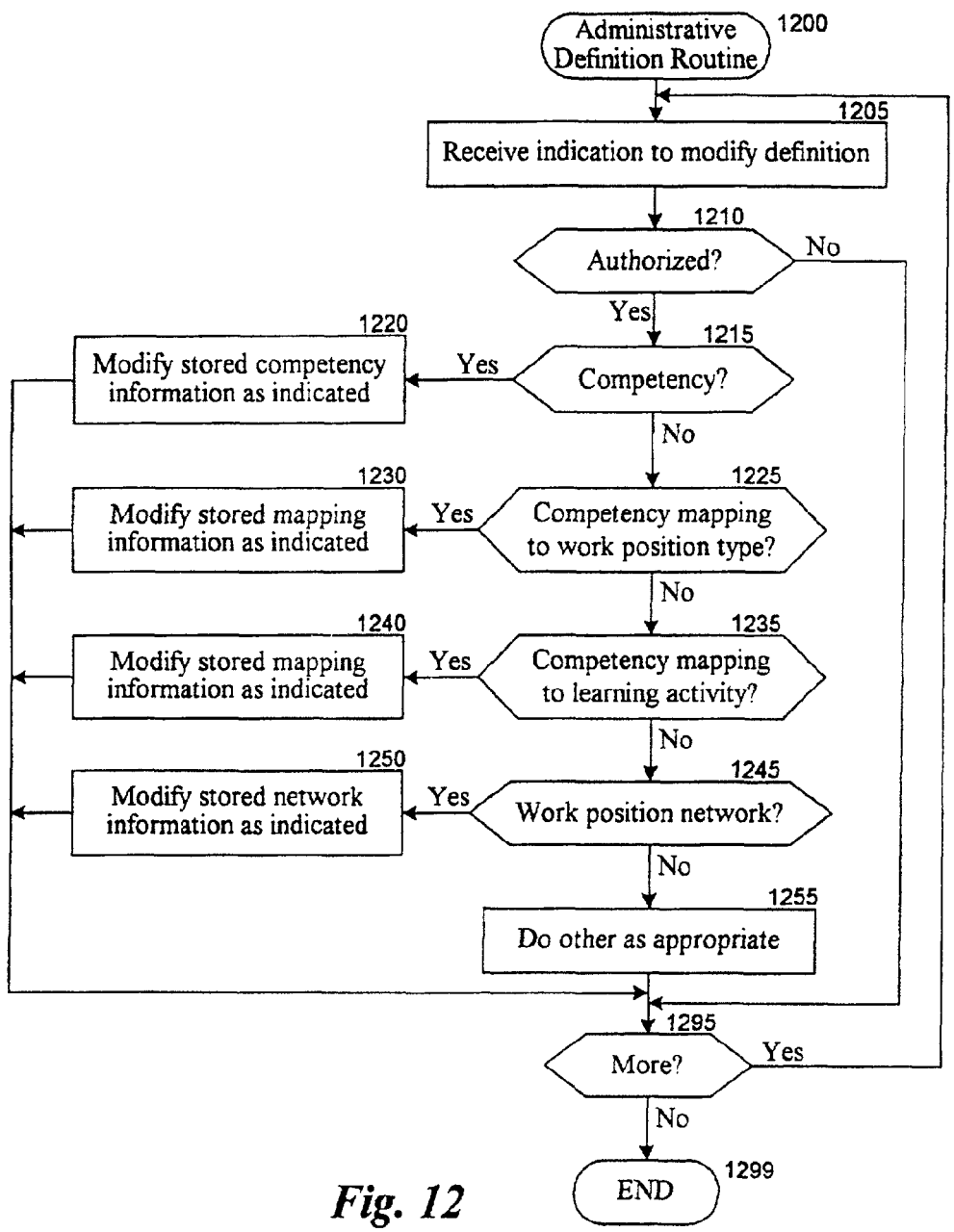
FIG. 12 is a flow diagram of an embodiment of the Administrative Definition routine.

FIG. 12 is a flow diagram of an embodiment of the Administrative Definition routine 1200. The routine allows administrators to specify various competency-related configuration information to be used by other CLM system components.

The routine begins at step 1205 where an indication is received from the administrator to specify or modify a competency-related definition or to specify or modify a definition for a work position type network. The routine continues to step 1210 to determine if the user is authorized to make the specified change (e.g., based on access or authorization information provided by the user), and if not continues to step 1295. If the user is authorized, the routine continues to step 1215 to determine whether the user has specified competency information (e.g., a change to a competency hierarchy for the organization), and if so, the routine continues to step 1220 to modify the competency information as indicated.

If it was instead determined in step 1215 that the initially received indication was not to modify competency information, the routine continues to step 1225 to determine whether the indication was related to the mapping of competency (and optionally skill rating systems) to defined work position types. If so, the routine continues to step 1230 to modify the mappings as indicated. If it was instead determined in step 1225 that the initially received indication was not related to the mappings of competencies to work position types, the routine continues to step 1235 to determine whether the initially received indication was related to the mappings of competencies (and optionally rating systems) to define learning activities. If so, the routine continues to step 1240 to modify the mappings between competencies and learning activities as indicated.

If it was instead determined in step 1235 that the received indication was not related to mappings between competencies and learning activities, the routine continues to step 1245 to determine if the initially received indication was related to the definition of a work position type network. If so, the routine continues to step 1250 to modify the stored work position network definitions as indicated. If it was instead determined in step 1245 that the initially received indication was not related to work position type network definitions, the routine continues to step 1255 to perform another indicated action if appropriate (e.g., defining a skill rating system with multiple skill levels). After steps 1220, 1230, 1240, 1250, or 1255, the routine continues to step 1295 to determine whether to continue. If so, the routine returns to step 1205, and if not the routine continues to step 1299 and ends.

Figure 13:
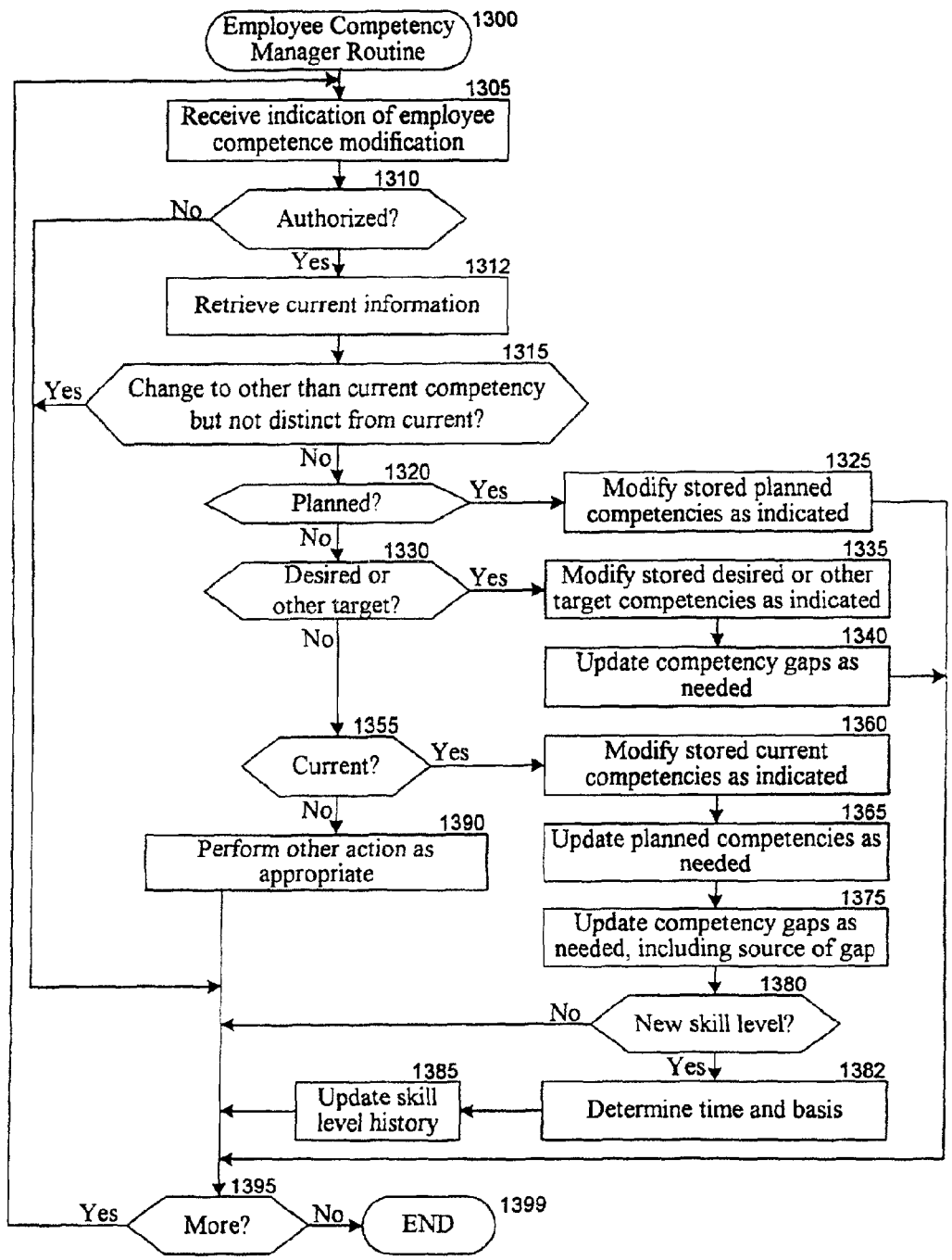
FIG. 13 is a flow diagram of an embodiment of the Employee Competency Manager routine.

FIG. 13 is a flow diagram of an embodiment of the Employee Competency Manager routine 1300. The routine receives indications of modifications to competency-related information for employees, and updates the competency information as appropriate.

The route begins at step 1305 where an indication is received of a modification to competency-related information for an employee. The routine then continues to step 1310 to determine whether the user from which the indication is received is authorized to make the modification, and if not continues to step 1395. If the user is authorized, the routine continues to step 1312 to retrieve various competency-related information for the indicated employee. In step 1315, the routine then determines if the indication is related to a modification for something other than a current competency of the employee, and if so whether an existing current competency of the employee negates the need for the modification. For example, if a user already has a specified skill level of a specified skill, the illustrated embodiment does not allow a target competency to be set for that current skill level of that skill or a lower skill level. Thus, if it is determined in step 1315 that this condition exists, the routine continues to step 1395. If not, the routine continues to step 1320 to determine whether the indication is related to a modification of a planned competency for the employee. If so, the routine continues to step 1325 to modify the stored planned competencies for the employee as indicated if appropriate (e.g., if the planned competency modification would merely produce redundant information, the modification would not be made).

If it is instead determined in step 1320 that the indicated modification is not related to a planned competency, the routine continues to step 1330 to determine if the indication is related to a desired or other target competency. If so, the routine continues to step 1335 to modify the stored target competencies for the employee as indicated if appropriate. The routine then continues to step 1340 to update competency gaps for the employee if appropriate, such as to treat a newly specified desired competency as a competency gap. If other information is to be associated with competency-related information being modified, such as a criticality or other related value to the employee or organization, such information can be supplied in various ways. In some embodiments, such information will be supplied with the initially received indication in step 1305. In other embodiments, the user may be prompted for such information if it is missing, or in other embodiments such information may be determined automatically (e.g., based on defaults or intelligent processing) or left blank if not specified.

If it was instead determined in step 1330 that the indicated modification was not to a target competency, the routine continues to step 1355 to determine if the modification was with respect to a current competency of the user. If so, the routine continues to step 1360 to modify the stored current competencies of the user as indicated if appropriate. The routine then continues to step 1365 to update the planned competencies of the employee as appropriate (e.g., if the achievement of the current competency represents an achievement of a planned competency). The routine then continues to step 1375 to update the current competency gaps for the employee as appropriate (e.g., if the achievement of the current competency eliminates one or more existing competency gaps), including updating the source of any such competency gaps as appropriate. For example, if a competency gap that is being removed resulted from a target competency, that target competency will also be removed for the employee as it has now been satisfied.

The routine then continues to step 1380 to determine whether the modification of the current competency was for a skill having multiple associated skill levels. If so, the routine continues to step 1382 to determine a time of the achievement of the new skill level as well as a basis for achieving that new skill level, and then continues to step 1385 to update a skill level history for the employee to reflect the new skill level along with the determined time and basis. As with other competency-related information, time and basis information can be determined in a variety of ways, such as based on information supplied in step 1305, information available from other CLM system components or related components (e.g., information about completion of an online course or exam from a learning activity scheduler component), etc. If it was instead determined in step 1355 that the indicated modification was not related to a current competency, the routine continues to step 1390 to perform another competency-related modification if appropriate. After steps 1325, 1340, 1385 or 1390, or if it was determined in step 1380 that a new skill level was not achieved by the employee, the routine continues to step 1395 to determine whether to continue. If so, the routine returns to step 1305, and if not the routine continues to step 1399 and ends.

Figure 14:
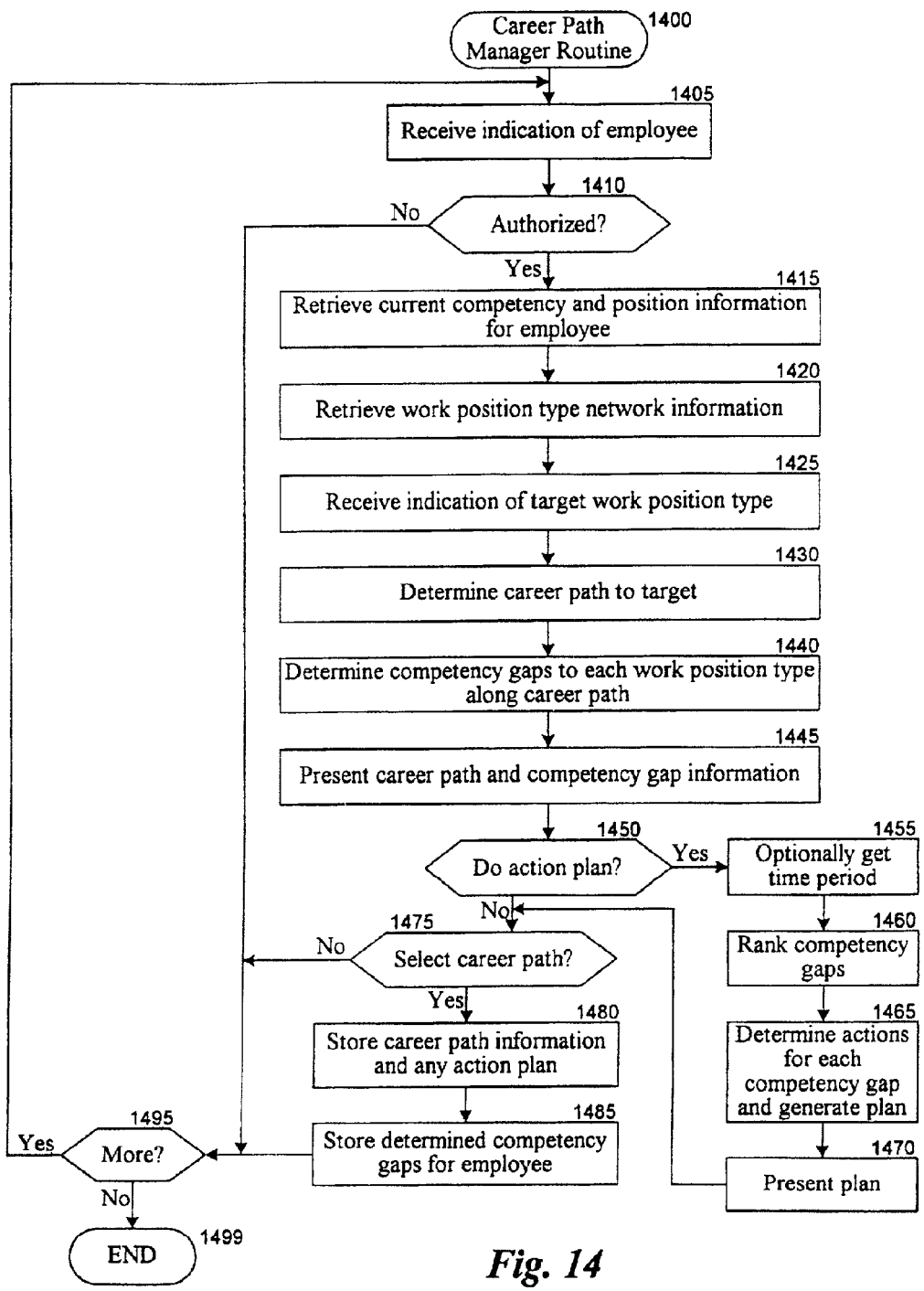
FIG. 14 is a flow diagram of an embodiment of the Career Path Manager routine.

FIG. 14 is a flow diagram of an embodiment of the Career Path Manager routine 1400. The routine allows employees or their managers to view and specify career path management information, including identifying future work position types as a goal for the employee.

The routine begins at step 1405 where an indication is received of an employee, and in step 1410 the routine determines whether the user is authorized to view and specify career path management information for the employee. If so, the routine continues to step 1415 where current competency-related information and current work position type information for the employee is retrieved. The routine then continues to step 1420 where previously defined work position type network definition information for the organization is retrieved. In step 1425, the routine then receives an indication from the user of a target work position type for the employee.

In the illustrated embodiment, the current work position type of the employee will be used as a starting point for purposes of determining possible career paths to the indicated target work position type, but in other embodiments the user may be allowed to specify both one or more starting work position types that are independent from a current work position type. In addition, only one target work position type may be specified at a time in the illustrated embodiment, although in other embodiments multiple target work position types may be specified. Alternatively, in some embodiments the target work position type used for the career path management could be restricted to a work position type that immediately follows the starting work position type in the work position type network definition for the organization, and thus could be selected by default without an indication from the user if only one such target work position type was available for the current work position of the employee. In addition, the illustrated embodiment shows only the specification of a new career path based on an indicated target work position type, but those skilled in the art will appreciate that in other embodiments stored career path information could be retrieved and manipulated without requiring the specification of the target work position type again.

After step 1425, the routine continues to step 1430 to determine a career path from the start work position type to the target work position type. If multiple career paths are available, in the illustrated embodiment the routine automatically chooses one to be used (e.g., based on criteria such as shortest length or most common), but in other embodiments all of the possible career paths could be presented to the user, such as to allow the user to select one or more of those career paths for use. After retrieving the competency-related information for each work position type along the determined career path, the routine in step 1440 next determines competency gaps between each two adjoining work position types along the career path and in light of the employee's current competencies. In step 1445, the routine then presents to the user the career path information and corresponding competency gap information for the work position types along the career path, and may also present current competency information for the employee. If any additional non-competency restrictions are defined between any two work position types along the career path, they will also be presented.

The routine then continues to step 1450 to determine whether the user wishes to create an action plan for the employee related to the career path. If so, the routine continues to step 1455 where it optionally receives an indication of a time period by the end of which the determined competency gaps (or a selected subset of them) are to be eliminated by the action plan. In step 1460, the routine then ranks the determined competency gaps in order of importance for the employee to eliminate them, such as by ranking those competency gaps that prevent the employee from reaching the next work position type along the career path as the highest or instead ranking competency gaps most highly if their elimination would most improve the employee's relative value within the organization. In step 1465, the routine then determines one or more actions for each competency gap, such as identifying learning activities that when completed would reduce or eliminate those competency gaps, and generates a corresponding plan. If any additional restrictions were specified along the career path, one or more actions will also be determined for each such restriction and included in the plan. The plan is then presented to the user in step 1470. While not part of the illustrated embodiment, the user may in other embodiments be allowed to interactively modify the action plan in various ways, such as to select one of multiple action options for a competency gap that is to be performed, reordering action options and/or re-ranking competency gaps, adding or removing action options and/or competency gaps, etc.

After step 1470, or if it was instead determined in step 1450 that an action plan was not to be generated, the routine continues to step 1475 to determine whether to select the determined career path as a defined goal for the employee. In other embodiments, additional functionality could also be provided, such as the following: identifying available work positions for the employee for consideration (e.g., for future work position types along the career path if the employee is expected to be qualified for those work positions by the time that the work positions are to be filled); providing various details about one or more work position types along the career path (e.g., a job description, a salary range, a comparison to actual or example employees that are currently in that work position type, etc.); identifying additional work position types that are not along the determined career path but in which the employee may have an interest (e.g., based on current or planned competencies of the employee qualifying them for those work positions); etc.

If it is determined in step 1475 to select the determined career path for the employee, the routine continues to step 1480 to store the career path information for the employee, including any action plans generated by the routine. The routine then continues to step 1485 to identify competency gaps to be added to the employee's competency gap information based on the career path and/or action plan (e.g., the competency gaps for the next work position type along the career path, a subset of the highest-ranking competency gaps, or all of the competency gaps), and stores those identified competency gaps for the employee (e.g., by executing the Employee Competency Manager routine and supplying an indication of the employee and the competency gaps). In embodiments in which information about the source of a competency gap is stored and used, source information can also be included to indicate that the stored career path and/or its corresponding action plan are the source for those competency gaps, either alone or in combination with a manager recommendation. After step 1485, or if it was instead determined in step 1410 that the user was not authorized or in step 1475 that the career path was not selected, the routine continues to step 1495 to determine whether to continue. If so, the routine returns to step 1405, and if not the routine continues to step 1499 and ends.

Figure 15:
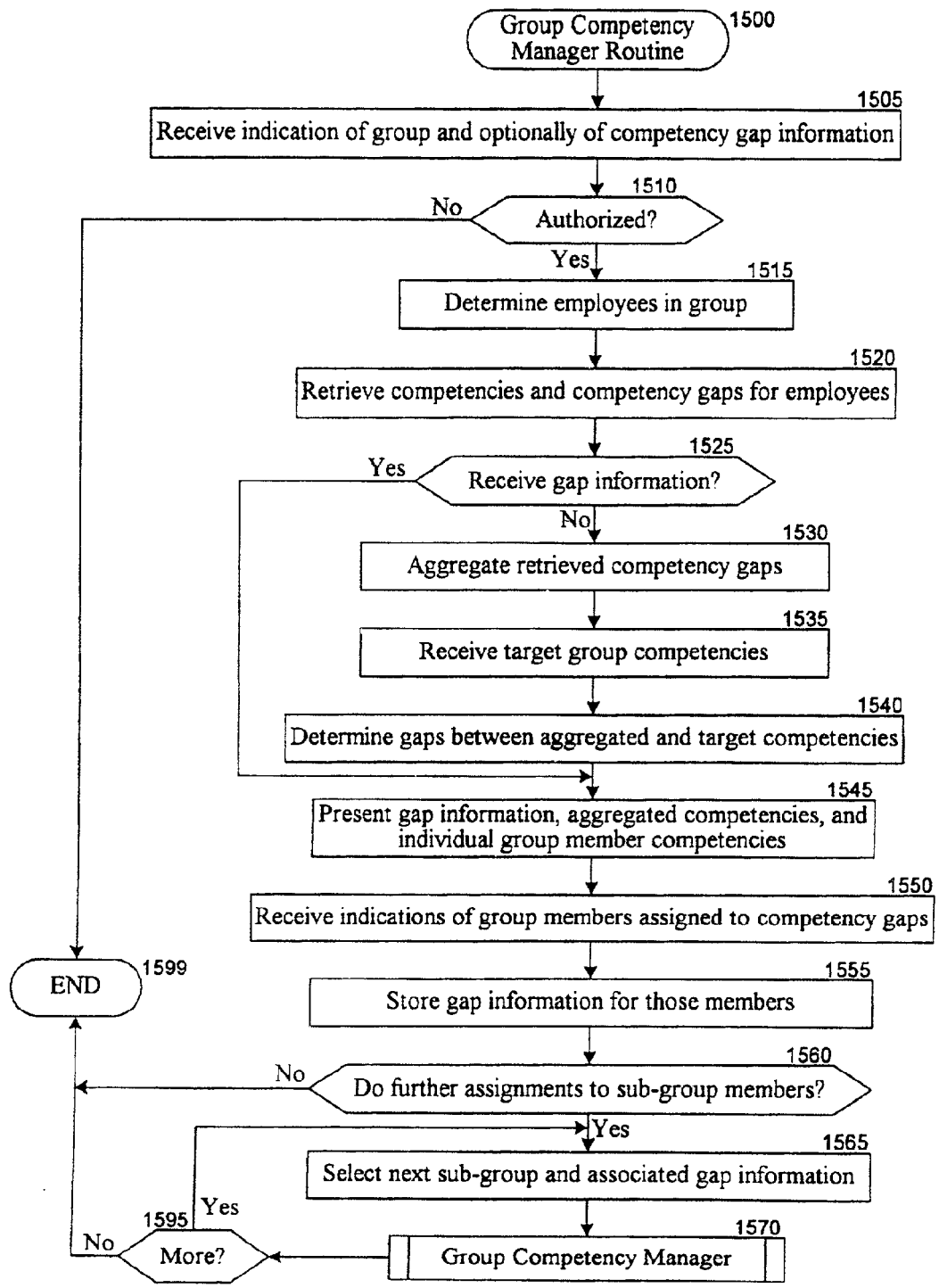
FIG. 15 is a flow diagram of an embodiment of the Group Skill Manager routine.

FIG. 15 is a flow diagram of an embodiment of the Group Competency Manager routine 1500. The routine allows a manager of a group to review current competencies of a group and to specify target competencies for that group, and to then optionally determine an action plan for how resulting competency gaps are to be resolved.

The routine begins in step 1505 where an indication is received of a group, and competency gap information is optionally received. The routine then continues to step 1510 to determine whether the user performing the routine is authorized to review and modify such group competency information, and if not the routine continues to step 1599 and ends. In other embodiments, the routine could instead determine whether to continue executing, such as by returning to step 1505 and receiving new group indications.

In the illustrated embodiment, if it is determined in step 1510 that the user is authorized, the routine continues to step 1515 to determine the employees that are members of the group, such as by retrieving stored information if available or instead performing a dynamic determination if stored information is not available. When members of the group are themselves sub-groups having multiple members, in the illustrated embodiment employee information for the sub-groups will be retrieved and provided so that all employees in the hierarchical organization below the indicated group will be determined. The routine then continues to step 1520 to retrieve the competency-related information for the determined employees. In step 1525, the routine then determines if competency gap information was supplied in step 1505, and if so the routine continues to step 1545. Otherwise, the routine instead continues to step 1530 to aggregate the retrieved competency information for the determined group employees, to receive target competency-related information for the group in step 1535, and to determine competency gaps between the current and target group competency-related information in step 1540.

After step 1540, the routine in step 1545 presents to the user the competency gap information for the group and the group member employees. In step 1550, the routine then optionally receives from the user one or more indications each specifying one or more of the group members to whom a competency gap is to be assigned (whether in full or in part), thus making it the responsibility of that group member to correct the competency gap that is assigned to them. If any of the group members are sub-groups, competency gaps can similarly be assigned to the sub-group, with the current user or a manager for that sub-group then able to further assign those competency gaps to members of that sub-group. That practice can continue on in a recursive downward manner. While not illustrated here, the user can also in some embodiments attempt to identify potential new group members that have current or planned competencies that would reduce or eliminate the competency gaps of the group, such as by using an employee locator service to identify relevant current employees and/or by generating a new job requisition job for a work position type that includes the appropriate competencies.

After step 1550, the routine continues to step 1555 to store the assigned competency gaps for any group members which received them (e.g., by executing the Employee Competency Manager routine). The routine then continues to step 1560 to determine whether any members of the group which received assigned competency gaps are themselves sub-groups, and if so whether the user wishes to further assign those competency gaps to members of those sub-groups. If so, the routine continues to step 1565 to select a next such sub-group, beginning with the first, and then continues to step 1570 to execute the Group Competency Manager routine (e.g., in a recursive manner) for that sub-group and for that assigned competency gap. In step 1595, the routine then determines whether there are more such sub-groups, and if so returns to step 1565. If it is instead determined in step 1595 that there are not more such sub-groups, or in step 1560 that there are not group members that are sub-groups with assigned competency gaps for which the user wishes to perform additional processing, or in step 1510 that the user is not authorized, the routine continues to step 1599 and ends.

Figure 16:
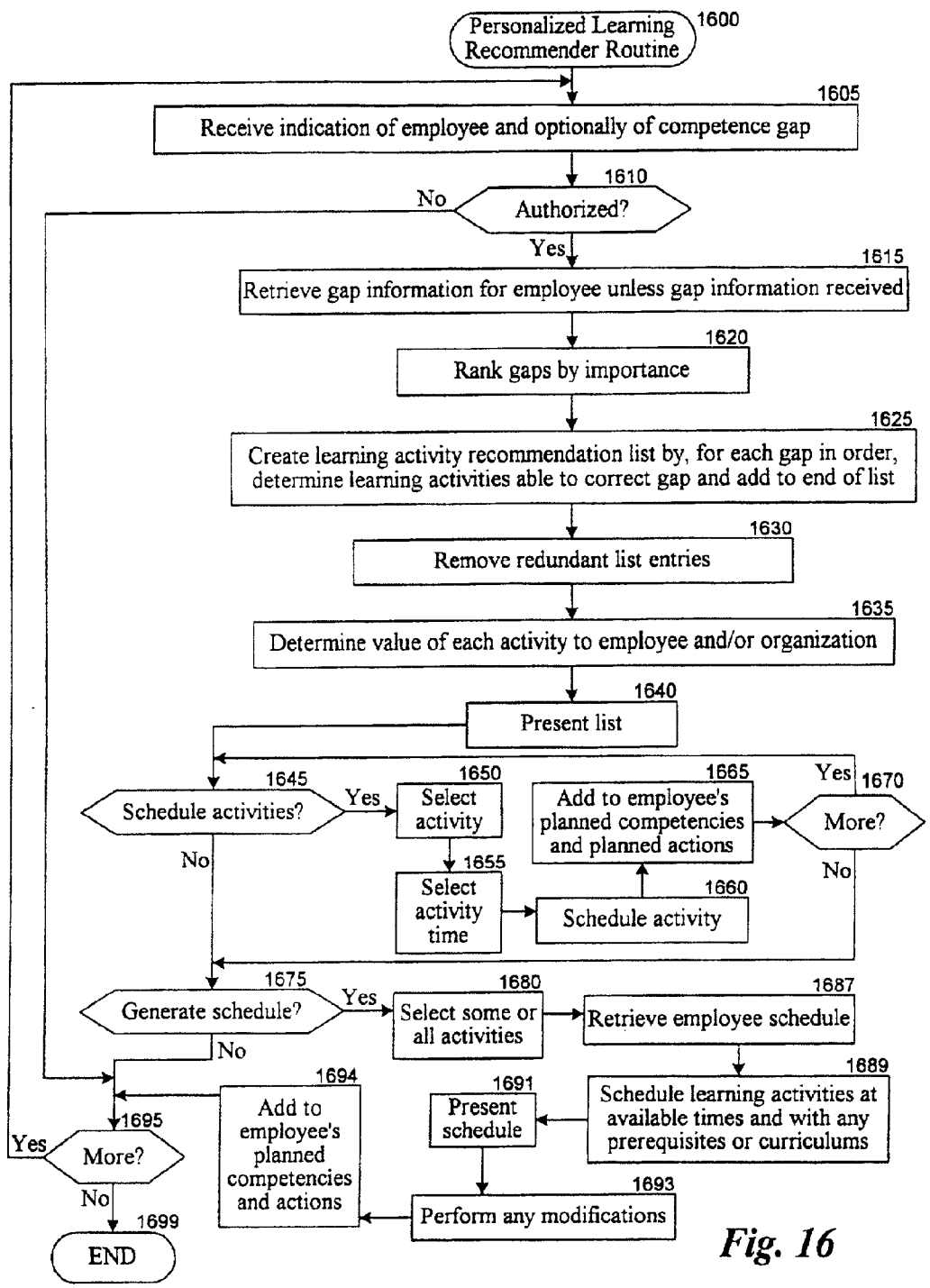
FIG. 16 is a flow diagram of an embodiment of the Personalized Learning Recommender routine.

FIG. 16 is a flow diagram of an embodiment of the Personalized Learning Recommender routine 1600. The routine determines personalized recommendations of learning activities for an employee based on competency gaps associated with that employee, and presents that information for use by the employee.

The routine begins in step 1605 where an indication is received of an employee, and where competency gap information for the employee is optionally received. In step 1610, it is determined if the user is authorized to perform the routine, and if so the routine continues to step 1615 to retrieves competency gap information for the employee if it was not supplied in step 1605. After step 1615, the routine continues to step 1620 to rank the competency gaps in their order of importance. As previously discussed, such competency gap ranking can be performed in a variety of ways, such as based on assigned criticality of competency gaps (e.g., as assigned by the source of the competency gap, such as when the competency gap is from a definition for a work position type and the competency gap is for a required competency having that criticality value), a size of the competency gap, etc.

In step 1625, the routine creates a list of learning activity recommendations by determining learning activities able to correct the ranked gaps, such as learning activities that have corresponding associated resulting competencies. Information about learning activities can be retrieved from various sources, such as an internal and/or external server or by interacting with an appropriate component such as a learning activity scheduler component. In step 1630, any duplicate learning activity entries on the recommendation list are removed by retaining the first of each such learning activity on the list. If a learning activity was present on the list to correct two or more different competency gaps, the remaining learning activity entry is modified to reflect each competency gap that will be corrected. In step 1635, the value of each remaining learning activity is then determined (e.g., to the employee and/or to the organization), such as based on the importance of the corresponding competency gaps and/or by using an independent valuation system.

The routine then continues to step 1640 to present the list of learning activity recommendations with associated values to the user. If it is determined in step 1645 that the user would like to schedule one or more of the learning activities, the routine continues to step 1650 to select a particular learning activity. In step 1655, a particular instance of the learning activity is selected (if there is more than one) based on the activity time, and in step 1669 the activity is scheduled. In step 1665, the information for the scheduled activity is then added to planned actions of the employee, and expected resulting competencies from the learning activity are added to the planned competency information for the employee (e.g., by executing the Employee Competency Manager routine). If it is determined in step 1670 that there are more activities to be selected, the routine returns to step 1645. If not, or if it was instead initially determined in step 1645 that no activities were to be scheduled, the routine continues to step 1675 to determine whether to generate a schedule for some or all of the learning activities.

If so, the routine continues to step 1680 to select some or all of the learning activities (e.g., based on a received indication from the user), and in step 1687 retrieves schedule information for the employee. In step 1689, a schedule for the selected learning activities is then generated based on available times in the employee's schedule, taking into consideration any prerequisites or related courses from a curriculum that are also to be scheduled. In some embodiments, the user and/or employee may optionally be able to specify a time period over which the scheduled learning activities are to occur. The generated schedule is then presented to the user in step 1691, and in step 1693 the user can optionally make one or more modifications to the generated schedule. In step 1694, any remaining scheduled learning activities are then added to the planned actions for the employee, and the planned competencies of the employee are also updated to reflect those activities. After step 1694, or if it was instead determined in step 1675 not to generate a schedule or in step 1610 that the user was not authorized, the routine continues to step 1695 to determine whether to continue. If so, the routine returns to step 1605, and if not the routine continues to step 1699 and ends.

Figure 17:
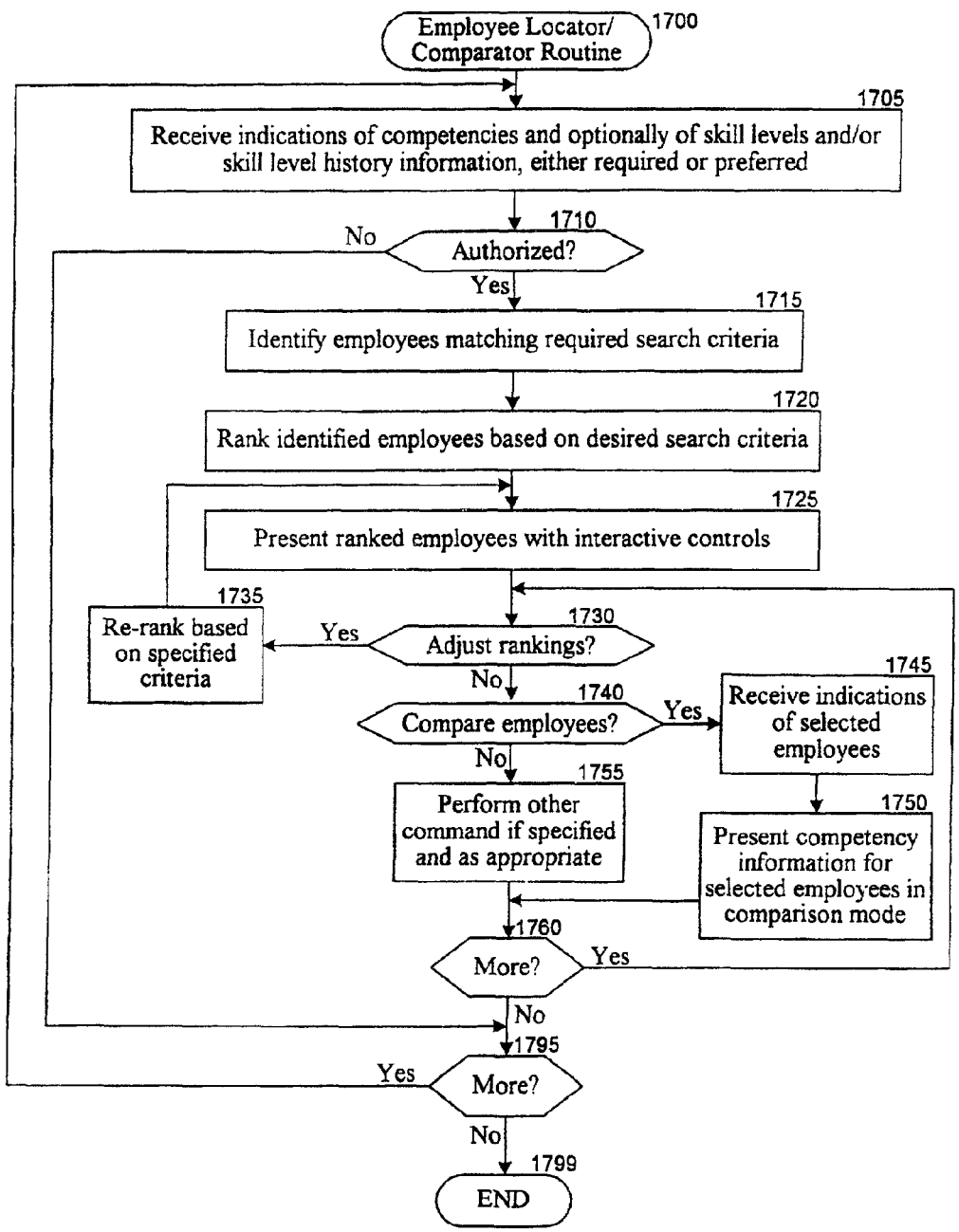
FIG. 17 is a flow diagram of the Employee Locator/Comparator routine.

FIG. 17 is a flow diagram of the Employee Locator/Comparator routine 1700. The routine receives indications of competency-related search criteria, identifies matching employees, and optionally provides comparison information about those employees.

The routine begins in step 1705 where an indication is received of at least one competency, and where skill level information and/or skill level history information are optionally received for any indicated skill-based competencies. In the illustrated embodiment, the user can optionally specify whether any of the specified search criteria are required or merely preferred when determining employees that match the search criteria. The skill level history information that can be used for searching can vary in different embodiments, and can include information such as dates in which any or specified skill levels were achieved, achievement bases for any or a specified skill level, numbers of previous skill levels for a specified skill, etc. After step 1705, the routine continues to step 1710 to determine whether the user is authorized to perform the indicated search. If so, the routine continues to step 1715 to perform a search to identify employees having any competencies, skill levels, and skill level history information that was indicated to be required. If any competency, skill level and/or skill level history information was indicated as being preferred, then in step 1720 any identified employees are ranked on the basis of that preference information. In other embodiments, additional or substitute criteria could instead be used for ranking of employees, such as by using a predefined hierarchy of preferred skill level history achievement bases (e.g., organization courses being more preferred than third-party courses which themselves are more preferred than self-assessments), by ranking employees with higher skill levels of a required skill higher than other employees having lower skill levels (assuming skill level information was not specified as part of the search criteria), etc.

The routine then continues to step 1725 to present the ranked employees to the user, and in the illustrated embodiment provides interactive controls to allow the user to adjust the rankings using various criteria and/or to specify two or more employees to be compared to each other. It is then determined in step 1730 whether the user wishes to adjust the rankings, and if so the routine continues to step 1735 to receive an instruction about how to perform the re-ranking and to then re-rank the employees as indicated. The routine then returns to step 1725 to present the re-ranked employees. If it was instead determined in step 1730 that the user did not want to adjust the ranking, the routine continues to step 1740 to determine whether the user wishes to compare multiple employees. If so, the routine continues to step 1745 to receive indications of two or more employees, and in step 1750 presents competency-related information about each employee in a manner to facilitate comparison. In some embodiments, the user may be able to specify types of information to be used for the comparison, and other types of information that is not competency-related may also be used as part of the comparison instead of or in addition to the competency-related information.

If it was instead determined in step 1740 that the user did not want to compare the employees, the routine continues to step 1760 to perform another command if one was specified and it is appropriate. For example, the user may wish to retrieve specified types of non-competency-related information for the employee and present that information. After steps 1750 or 1755, the routine continues to step 1760 to determine whether to perform more interactive controls for the current identified employees. If so, the routine returns to step 1730. If not, or if it was determined in step 1710 that the user was not authorized, the routine continues to step 1795 to determine whether to continue. If so, the routine returns to step 1705, and if not the routine continues to step 1799 and ends.

Those skilled in the art will also appreciate that in some embodiments the functionality provided by the routines discussed above may be provided in alternative ways, such as being split among more routines or consolidated into less routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A method in a computing system comprising:
   managing a plurality of career paths, wherein
   the managing is performed using a competency management server,
   the competency management server comprises
   a central processing unit (CPU),
   an administrative definition component,
   a career path manager component, and
   an employee competency manager component,
   the career paths are future career paths of employees of an organization,
   each of the employees has a set of current competencies tracked by the organization,
   each of the set of competencies is one of a skill, capability, credential, and experience, and
   the managing comprises:
   assisting an administrator for the organization in defining conditions related to the career paths within the organization, wherein the defining is performed using the administrative definition component, and assisting the administrator for the organization comprises:
   for each of multiple work position types within the organization, receiving from the administrator
   a corresponding set of required competencies, wherein each of the set of competencies is one of a skill, capability, credential, and experience, and
   an indication of one or more other potential next work position types to which employees in work positions of that work position type can move, and
   automatically creating a network of related work position types by linking each work position type to each of the indicated potential next work position types for that work position type, and
   assisting multiple employees of the organization in managing a respective future career path within the organization, wherein the assisting multiple employees of the organization is performed using the career path manager component and comprises:
   for each of the multiple employees,
   receiving from the employee an indication of a target work position type that is distinct from a current work position type of the employee,
   automatically identifying a career path for the employee through the created work position type network that includes a series of work position types from the current work position type to the target work position type, automatically retrieving the tracked set of current competencies of the employee, automatically determining a next work position type in the series after the current work position type and determining one or more competency gaps between the current competency set of the employee and the competency set corresponding to the determined work position type, for each work position type in the series after the determined next work position type, automatically determining one or more competency gaps between the competency set corresponding to a previous work position type in the series and the competency set corresponding to that work position type, automatically determining an action plan for the employee that includes one or more actions for each of the determined competency gaps over a period of time, such that performance of the actions by the employee over the period of time will eliminate the determined competency gaps, and presenting the determined action plan to the employee for use in managing the identified career path.

2. The method of claim 1 including, after the presenting of the determined action plan to the employee:

receiving from the employee an indication of one or more of the actions included in the determined action plan, and adding the indicated actions to a group of planned actions for the employee.

3. The method of claim 1 including, after the presenting of the determined action plan to the employee:

periodically determining whether actions included in that determined action plan have been performed by the employee, and reminding the employee of one or more of those included actions that are not determined to have been performed.

4. The method of claim 1 including, for each of the multiple employees, automatically scheduling for the employee at least some of the actions included in the determined action plan for that employee.

5. The method of claim 4 wherein the scheduling includes selecting times when the employee is available to perform each of the scheduled actions.

6. The method of claim 1 including, before the presenting of the determined action plan to the employee, ranking the actions included in the determined action plan based at least in part on determined values of performance of those actions to the employee, and wherein the presenting is performed in such a manner as to indicate the ranking of the included actions.

7. The method of claim 1 including, after the receiving of the indication of the target work position type from the employee, automatically providing information to the employee that describes that target work position type.

8. The method of claim 1 including, after the receiving of the indication of the target work position type from the employee, automatically providing information to the employee about one or more other employees whose work positions are of the target work position type.

9. The method of claim 1 including, after performance by the employee of at least some of the actions included in the determined action plan for the employee, automatically providing information to the employee about openings for work positions of the target work position type.

10. The method of claim 1 including, for each of at least one of the multiple employees, automatically determining one or more potential future work position types for the employee based at least in part on the tracked set of current competencies of the employee and presenting the determined potential future work position types to the employee, and wherein the received indication from the employee of the target work position type is a selection of one of the determined potential future work position types.

11. The method of claim 1 wherein the determining of the action plan for the employee includes determining multiple action options for one of the determined competency gaps such that performance of any of the determined action options would eliminate that one determined competency gap, and wherein the presenting of that determined action plan includes indicating the multiple determined action options.

12. The method of claim 1 wherein the presenting of the determined action plan to the employee includes presenting the series of work position types included in the identified career path for the employee and presenting the determined competency gaps for the employee.

13. The method of claim 1 including, after the receiving of the indication of the target work position type from the employee, automatically determining multiple possible career path options for the employee from the current work position type for the employee to that target work position type and presenting the determined multiple career path options, and wherein the identified career path for the employee is a selected one of the determined multiple career path options.

14. The method of claim 1 wherein the organization provides an information portal from which each of the employees can repeatedly receive a page of information with career path management information that is specific to that employee, the received pages for presentation on a computing device, and including determining current status information about the action plan for an employee for inclusion in the page of information for the employee each time that the employee is to receive the page of information so that current career path management information can be provided to the employee as part of the presenting of that page of information.

15. The method of claim 1 wherein each of the work position types is uniquely identified.

16. A computer-implemented method comprising:

managing future advancement paths of members of an organization, wherein the managing is performed using a competency management server, the competency management server comprises
a central processing unit (CPU),
an administrative definition component,
a career path manager component, and
an employee competency manager component, the organization has multiple position types that each have defined requirements, at least some of the position types comprise a position type network that specifies one or more next possible position types for each of at least some of the position types of the organization, and wherein the managing comprises:
receiving an indication of a target position type for a member, the target position type distinct from a current position type for the member, wherein the receiving is performed using the employee competency manager component, automatically identifying at least one possible advancement path from the current position type to the target position type based at least in part on the position type network, each identified advancement path including a series of one or more position types distinct from the current position type such that each position type in each series is one of the specified next possible position types for a previous position type in that series and/or for the current position type, wherein the identifying the at least one possible advancement path is performed using the career path management component, and for each of at least one of the identified possible advancement paths, for each position type along the included series for the identified possible advancement path other than a first of those position types, automatically determining one or more requirements for moving to that position type from a previous position type in that series, for each of the determined requirements, automatically determining one or more options for future actions of the member such that performance of any of the future action options would satisfy the determined requirement, and automatically providing indications of the determined future action options for use in assisting the member in moving along the identified possible advancement path to the target position type.

17. The method of claim 16 including ranking the identified future action options, and wherein the providing of the indications is performed in such a manner as to indicate the ranking.

18. The method of claim 17 wherein the ranking of the identified future action options is based at least in part on a determined value of performance of those future actions to the member.

19. The method of claim 17 wherein the ranking of the identified future action options is based at least in part on a determined value of performance of those future actions to the organization.

20. The method of claim 16 including automatically providing information to the member about the target position type.

21. The method of claim 16 including automatically providing information to the member about one or more other members that have had positions of the target position type.

22. The method of claim 16 including automatically providing indications to the member of openings for positions of the target position type.

23. The method of claim 22 wherein the providing of the indications of position openings is performed after performance by the member of at least some of the determined future action options.

24. The method of claim 16 wherein the indication of the target position type is automatically determined for the member based at least in part on current competencies of the member.

25. The method of claim 24 including determining multiple potential future position types for the member, and wherein the received indication of the target position type is a selection by the member of one of the determined potential future position types.

26. The method of claim 16 wherein the determining of the requirements for moving to each of the position types from the previous position type includes excluding requirements already satisfied by the member.

27. The method of claim 16 wherein at least some of the determined requirements for moving to position types are competencies associated with those position types wherein each of the competencies is one of a skill, capability, credential, and experience.

28. The method of claim 16 wherein at least some of the determined requirements for moving to position types are associated non-competency restrictions.

29. The method of claim 16 wherein at least some of the determined requirements for moving to position types are competency gaps associated with the member.

30. The method of claim 16 including determining one or more requirements for moving to the first position type in the included series from the current position type.

31. The method of claim 16 wherein at least some of the included series of position types further include the current position type.

32. The method of claim 16 including generating a schedule for the member that includes multiple of the determined future action options and providing an indication of the generated schedule.

33. The method of claim 16 including, for each of at least one of the indicated future action options, providing one or more indications of multiple future instances of that indicated future action.

34. The method of claim 33 including receiving an indication of one of the indicated instances and scheduling the member for the indicated future action instance in response.

35. The method of claim 16 wherein the determining of the future action options excludes actions already performed by that member.

36. The method of claim 16 including, in response to a selection of one of the indicated future action options by the member, facilitating the performance of the selected action by the member in an automated manner.

37. The method of claim 16 including, in response to a selection of one of the indicated future action options by the member, performing the selected action for the member.

38. The method of claim 16 including later determining whether indicated future action options have been performed by the member and providing an indication of one or more of those actions that have not been performed.

39. The method of claim 16 including identifying multiple possible advancement paths for the member, and wherein the determining of the requirements and the determining of the future action options are performed for one of those possible advancement paths selected by the member.

40. The method of claim 16 wherein the included series for each of the identified possible advancement paths have multiple position types.

41. The method of claim 16 wherein the providing of the indications of the determined future action options includes presenting those indications to the member.

42. The method of claim 41 wherein the presenting of the indications is performed as part of each load of an information page generated for that member.

43. The method of claim 16 wherein the provided indications of the determined future action options for an identified advancement path include indications of the series of position types included in that identified advancement path.

44. The method of claim 16 wherein the provided indications of the determined future action options for an identified advancement path include indications of the determined requirements for that identified advancement path.

45. The method of claim 16 wherein the members of the organization are employees of a business, and wherein the method is performed for each of multiple of the employees.

46. The method of claim 45 wherein the position types are work position types for the business, and wherein the advancement paths are career paths for the employees.

47. The method of claim 16 including storing indications of one or more of the indicated future action options as performance goals for the member.

48. The method of claim 16 wherein the indication of the target position type is received from the member.

49. The method of claim 16 wherein the indication of the target position type is received from a supervisor of the member.

50. The method of claim 16 wherein the indicated future action options are provided to a supervisor of the user.

51. A computer-readable medium whose contents cause a computing device to manage a future career for an individual, by performing a method comprising:
   receiving an indication of a target work position for an individual that is distinct from a current work position for the individual;
   automatically managing a future career for the individual by determining one or more future actions that when performed by the individual would satisfy criteria for moving along a possible career path from the current work position to the target work position; and
   providing indications of the determined future actions for use by the individual in moving along the possible career path to the target work position, wherein each of one or more intermediate work positions along the possible career path represents one of multiple work positions of an indicated work position type, wherein
      the individual is a member of an organization, and including identifying the possible career path from the current work position to the target work position based at least in part on a work position network for the organization that specifies one or more next possible work positions for each of multiple work positions of the organization.

52. The computer-readable medium of claim 51 wherein the individual is an employee of a business, wherein the possible career path from the current work position to the target work position includes a series of one or more intermediate work positions, and wherein the intermediate work positions are positions provided by the business.

53. The computer-readable medium of claim 51 wherein the computer-readable medium is a memory of a computing device.

54. The computer-readable medium of claim 51 wherein the computer-readable medium is a data transmission medium transmitting a generated data signal containing the contents.

55. The computer-readable medium of claim 51 wherein the contents are instructions that when executed cause the computing device to perform the method.

56. The computer-readable medium of claim 51 wherein the possible career path from the current work position to the target work position includes a series of one or more work positions distinct from the current work position and such that each work position in the series other than a first of those work positions is a possible next work position for a previous work position in that series, wherein the managing of the future career for the individual includes identifying the possible career path and determining one or more criteria for moving to each work position along the included series from a previous work position in that series, and wherein the determining of the one or more future actions includes identifying future actions that when performed by the individual would satisfy the determined criteria.

57. A computing device comprising:
   a career path management component for assisting in career path management, wherein career path management component comprises:
      a career path manager component that is capable of, for each of multiple members of an organization, receiving an indication of a target organizational position type for the member that is distinct from a current organizational position type for the member, identifying a possible career path from the current position type to the target position type that includes a series of one or more position types distinct from the current position type such that each position type in the series other than a first of the position types is a next possible position type for a previous position type in the series, automatically determining one or more requirements for moving to each of at least some of the position types along the series from the previous position type in that series, and automatically determining one or more future actions whose performance by the member would satisfy the determined requirements, and
      an information providing component that is capable of automatically providing indications of the determined future actions to members for use in assisting those member in moving along the identified possible career paths.

58. The computing device of claim 57 wherein the career path manager component is executing in memory of the computing device.

59. A computer system comprising:
   means for assisting in career path management comprising:
      means for managing future advancement paths of members of an organization, wherein
         the organization has multiple position types,
         each of the multiple position types has defined requirements,
         at least some of the position types comprise a position type network that specifies one or more next possible position types for each of at least some of the position types of the organization, and
         the means for managing comprising:
            means for receiving an indication of a target position type of said position types for a member of an organization that is distinct from a current position type of said position types for the member,
            means for identifying a possible career path from the current position type to the target position type that consists of a series of one or more position types distinct from the current position type such that each position type in the series other than a first of the position types is a next possible position type for a previous position type in the series,
            means for automatically determining one or more requirements for moving to each of the position types along the series from the previous position type in the series, and
            means for automatically determining one or more future actions a performance of which by the member would satisfy the determined requirements, and
      means for automatically providing indications of the determined future actions to the member for use in moving along the identified possible career path.

* * * * *

UNITED STATES PATENT AND TRADEMARK OFFICE
CERTIFICATE OF CORRECTION

PATENT NO. : 8,046,307 B2
APPLICATION NO. : 10/109972
DATED : October 25, 2011
INVENTOR(S) : Juergen Habichler et al.

It is certified that error appears in the above-identified patent and that said Letters Patent is hereby corrected as shown below:

On the Title page of the patent at Item (75) Inventors:

"Issac Lau" should be --Isaac Lau--.

Signed and Sealed this
Thirty-first Day of July, 2012

David J. Kappos
*Director of the United States Patent and Trademark Office*